United States Patent [19]

Kelley et al.

[11] 4,428,055
[45] Jan. 24, 1984

[54] TOOL TOUCH PROBE SYSTEM AND METHOD OF PRECISION MACHINING

[75] Inventors: John R. Zurbrick; John R. Kelley, both of Cincinnati, Ohio

[73] Assignee: General Electric Company, Salem, Va.

[21] Appl. No.: 293,799

[22] Filed: Aug. 18, 1981

[51] Int. Cl.³ ............................................. G06F 15/46
[52] U.S. Cl. ..................... 364/474; 318/572; 364/170; 364/508; 364/560; 408/11
[58] Field of Search ............................. 364/167–171, 364/474, 475, 550, 551, 508, 571, 560; 318/565, 569, 572, 632; 408/8–13

[56] References Cited

U.S. PATENT DOCUMENTS

| | | | |
|---|---|---|---|
| 2,866,301 | 12/1958 | Koulicovitch et al. | 51/165 |
| 3,447,419 | 6/1969 | Foster | 318/572 X |
| 3,504,581 | 4/1970 | Weichbrodt et al. | 82/1 |
| 3,548,648 | 12/1970 | Weichbrodt et al. | 73/104 |
| 3,550,107 | 7/1971 | Thompson et al. | 340/261 |
| 3,590,670 | 7/1971 | Thompson et al. | 408/11 X |
| 3,872,285 | 3/1975 | Shum et al. | 73/104 X |
| 3,986,010 | 10/1976 | Lankford et al. | 318/572 X |
| 4,118,871 | 10/1978 | Kirkham | 33/174 PC |
| 4,195,250 | 3/1980 | Yamamoto | 318/572 X |
| 4,281,385 | 7/1981 | Nakaso et al. | 364/170 X |
| 4,334,178 | 6/1982 | Lipp | 318/572 X |
| 4,371,941 | 2/1983 | Gordiski et al. | 364/475 |
| 4,371,942 | 2/1983 | Damikolas | 364/170 X |

FOREIGN PATENT DOCUMENTS 2069142 8/1981 United Kingdom ............... 364/170

OTHER PUBLICATIONS

Yampol's'KYY–"An Invariant System for Two–Circuit Control of a Lathe"–Soviet Automatic Control–vol. 14, No. 4, Jul./Aug. 1969, pp. 44–50.
"3 Dimensional Touch Trigger Probes for Machining Centers and Lathes"-80, Published by Renishaw Electrical Ltd., Gloucester Street, Wotton-Under-Edge, Gloucestershire GL 127DN England.

Primary Examiner—Joseph F. Ruggiero
Attorney, Agent, or Firm—Ormand R. Austin; Arnold E. Renner; James H. Beusse

[57] ABSTRACT

A system and method are disclosed for automatically machining a work piece to precise selectively determined dimensions under computer numerical control in which the cutting tool is set automatically and automatic on-machine inspection is performed of the machined work piece surfaces. Using vibration sensing to detect contact between the cutting edge of the cutting tool and position reference surfaces, the cutting edge is calibrated against these surfaces under closed loop control. The deviation between the programmed and the actual positions of the cutting edge at each reference surface is determined and an initial compensating tool position offset is automatically provided in each axis and is entered into numerical control means. After machining has been initiated, probing of the work piece occurs at least once before the final cut is taken. The tool functions as a tool touch probe during this operation and vibrations are sensed as the calibrated cutting edge is brought into contact with the machined surface. Appropriate tool position offsets are determined and entered into the numerical control means at that time, to assure that the dimensions of the finished surface will conform to the desired dimensions. After final machining has taken place, the finished surface is again probed with the calibrated cutting edge, using vibration sensing. Deviations from the desired dimensions are determined and are indicated together with the allowable machining tolerance for each dimension.

36 Claims, 18 Drawing Figures

Microfiche Appendix Included
(2 Microfiche, 87 Pages)

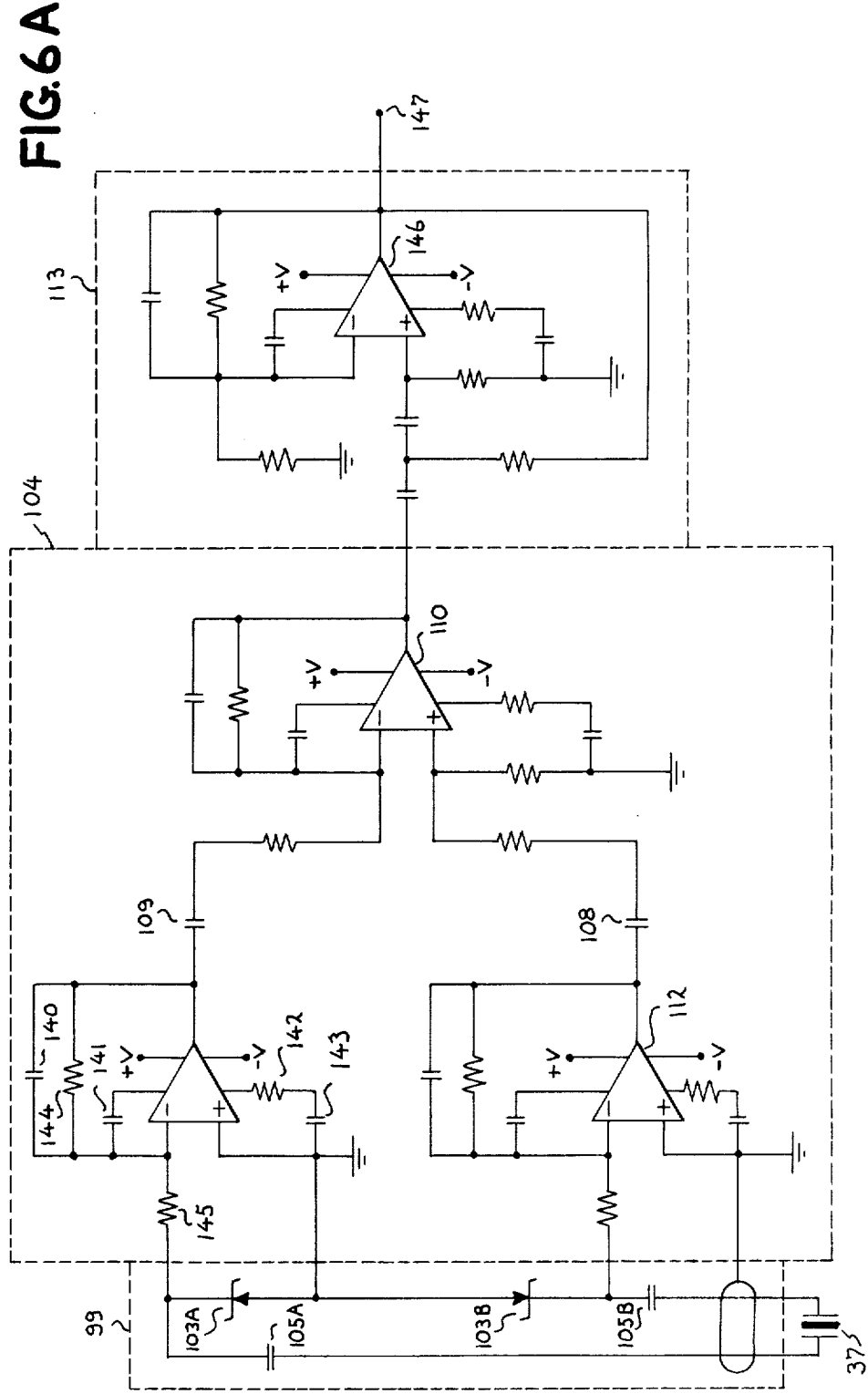

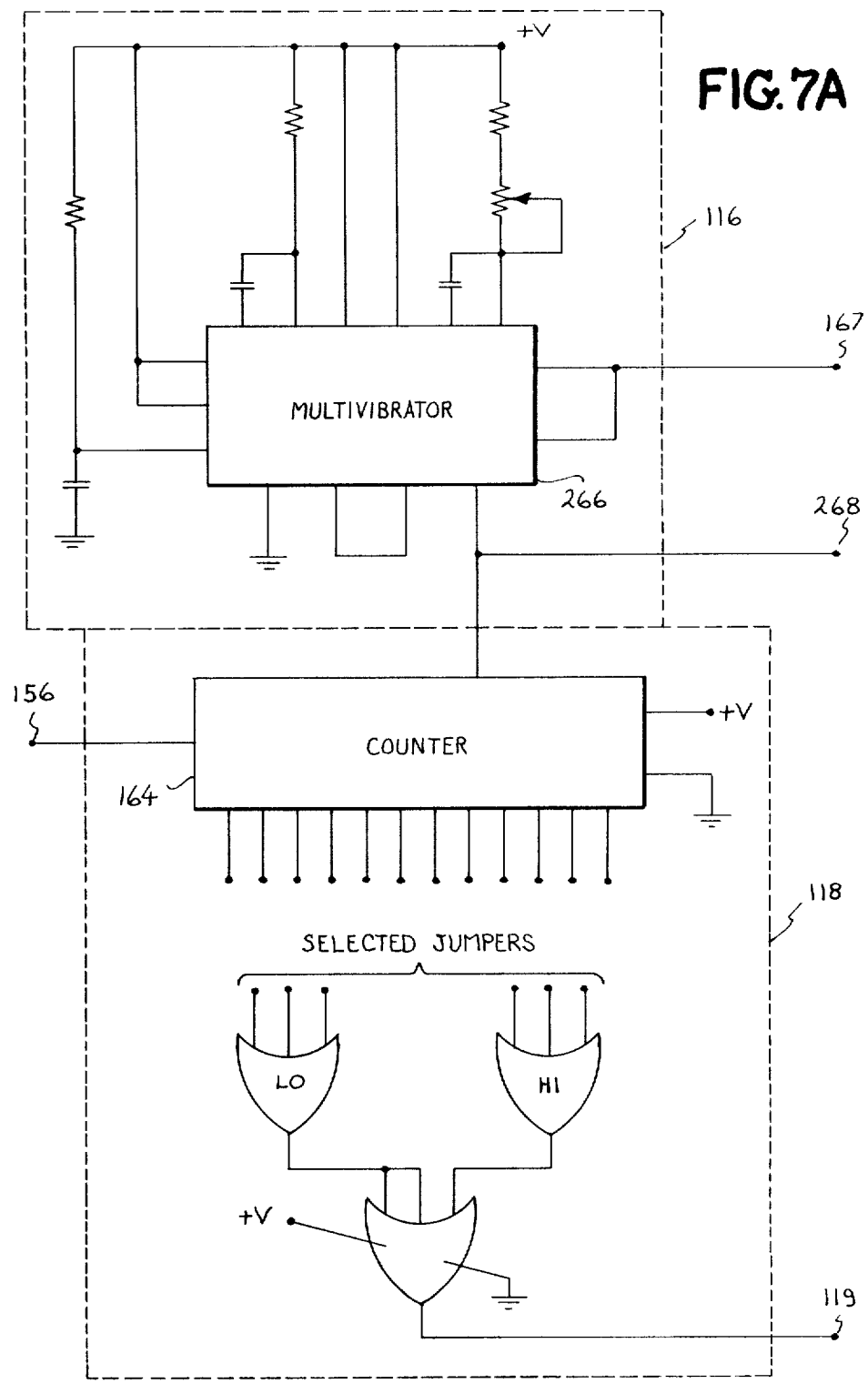

TOOL TOUCH PROBE SYSTEM AND METHOD OF PRECISION MACHINING

For the present invention, reference is made to a microfiche appendix hereto comprising 2 microfiche with a total of 87 frames.

The present invention relates in general to closed loop numerically controlled machining systems and in particular to a system and method for machining a work piece to precise, selectively determined dimensions wherein machining, associated calibrations and the implementation of the resultant tool position offsets are fully automated.

BACKGROUND OF THE INVENTION

At its present stage of development, the precision machining field is in a state of flux. Systems that are totally dependent on manual operations have largely given way to techniques whereby manufactured parts are made with general-purpose, numerically controlled machining systems. Although cutting or other removal of material occurs automatically in such systems, numerous manual operations are still required, primarily for measuring the machined dimensions and for making cutter adjustments using an ordinary numerical control cutter offset. These manual measurements and adjustments of the cutting tool are necessary to take into account a large number of variables, such as wear of the cutting tool, repositioning and/or replacement of the cutting tool, as well as dimensional changes of the cutting tool, of the work piece and of the machining apparatus itself due to such factors as heating, deflection under load and the like.

By way of example, in a typical operation carried out with a numerically controlled machine tool such as a lathe, certain adjustments, i.e. tool offsets, must be manually implemented by the operator after the machine is set up for the manufacture of a particular work piece or part. Prior to the start of machining the operator must advance the cutting tool to a tool setting surface and determine the tool position by manually measuring the space between the tool and the reference surface. This is normally done with a piece of shim material or the like, and such measurements then form the basis for manually making tool offsets. Where the lathe includes tool holding means such as a multiple tool turret, this operation must be carried out separately for each tool as well as for each of the axes (of motion) of the machine. Prior to making the final or finishing cut for a particular work piece surface, the various dimensions of the semi-finished work piece surface are measured by using a hand-held gauge. This enables the operator to determine the required offset of the cutting tool which is used for the finishing cut. After the finishing cut is made, the work piece is again checked with the hand-held gauge in order to measure the conformance of the actual dimensions of the finished surface to the desired dimensions.

The manual operations described above are individually time-consuming and take up a significant amount of the total time required to machine a particular work piece to the desired dimensions. This serves to limit the manufacturing capacity of the machine tool. Considering present day costs of a lathe or a milling machine (machining center), any reduction of the capacity of the machine tool becomes a matter of economic significance. Further, all such manual operations further open the manufacturing process to human error.

As is generally recognized, the solution to the foregoing problems is to automate manual measurements and the manual adjustments of the cutting tool, e.g. by the use of a computer-operated numerical control system. In such a system the computer may either be positioned remote from the numerical control unit, or it may be incorporated in the latter, e.g. in the form of a microcomputer. Alternatively, a computing capability may be provided remote from the numerical control unit as well as being incorporated into the latter. Instead of down-loading successive blocks of data stored on tape or the like, as is the case in an ordinary NC system, a computer numerical control (CNC) system is capable of storing entire programs and calling them up in a desired sequence, editing the programs, e.g. by addition or deletion of blocks, and carrying out the computations of offsets and the like.

Although fully automatic systems have not been widely adopted at this stage of development of the precision machining field, a considerable amount of development work has been done to date, much of it limited to special purpose situations wherein a single machining operation is repetitively carried out. It is also known to mount a tool sensor in the form of a touch trigger probe on the bed of the machining apparatus, or on a pivotal arm that can be swung out of the way when desired. The position of the cutting tool can be calibrated against such a probe by noting the tool position when contact with the probe occurs. From the observed deviations between the programmed and the actual positions, a compensating offset may be determined and stored in the memory associated with the computer numerical control means. The offset compensates for the difference between the programmed contact position and the actual contact position.

A system and method which incorporates the features described above is disclosed in a copending application by William A. Hunter and Allan R. Barlow, entitled "System and Method of Precision Machining," Ser. No. 283,850, filed July 16, 1981, U.S. Pat. No. 4,382,215 which is assigned to the assignee of the present application. As disclosed in the copending application, a touch trigger probe or part sensor is mounted in the tool holding means. The latter probe is first calibrated against datum or reference surfaces and is subsequently used to calibrate the tool sensor probe. Only then is the cutting edge of the selected tool calibrated by contact with the tool sensor probe. The initial tool offsets which are determined from the results of this operation are stored in numerical control means. After machining has taken place, the part sensor probe is again calibrated and is then used to probe the machined surface(s) of the work piece. The information so obtained determines the final offsets required for the finishing cut. Subsequently, the finished surface may be probed to determine its conformance with the desired dimensions.

The system and method described above use a touch trigger probe for both tool sensing as well as part sensing. Although simple in construction, the touch trigger probe must be configured for a class of specific features to be probed. The probes themselves, which are normally purchased as commercial products from specific vendors, tend to be fragile and they occupy at least one tool position on the tool holding means, e.g. on the lathe turret.

Other approaches which have been proposed for the form of closed loop machining under discussion here involve the use of lasers, eddy current, ultrasonics and conductivity probes. While all of these approaches can be made to work, they all have severe practical limitations in an actual shop operating environment.

Laser systems require line-of-sight mechanisms to position the probe. It is difficult to build such a device which is universally applicable and at the same time cost effective. Laser systems also have problems with surface reflectivity, particularly when cutting fluids are used.

Conductivity probes have insulating requirements for certain elements of the machine tool, such as the turret. Another problem associated with such probes is that of passing electrical signals through elements which constitute conductors of less than optimum conductivity, such as spindle bearings and slip rings.

Eddy current and ultrasonic probes have stringent requirements with respect to the proximity of the probe and the work piece, as well as stringent coupling requirements.

All such probes must further be articulated and configured for specific work piece configuration, e.g. where an internally machined surface must be measured. Thus, in general the systems described are complex, difficult to implement, and difficult to render cost effective by making them universally applicable to different types of precision machining situations.

OBJECTS OF THE INVENTION

It is a primary object of the present invention to provide a new and improved system and method of automatically machining a work piece to precise, selectively determined dimensions under computer numerical control, in which certain disadvantages of prior art systems and techniques are eliminated.

It is another object of the present invention to provide a new and improved system and method for automatically precision machining a work piece wherein manual probing and tool setting operations are substantially eliminated and the opportunity for operator error is materially reduced.

It is a further object of the present invention to provide a new and improved system for automatically precision machining a work piece, wherein the system uses vibration-responsive probing apparatus which is simple and economical in construction.

It is still another object of the present invention to provide a new and improved system and method for automatically precision machining a work piece in which probing is not limited to a particular work piece configuration or to particular machining apparatus.

It is still a further object of the present invention to provide a new and improved system and method for automatically precision machining a work piece, which has application beyond repetitive machining operations on a specified work piece.

It is yet a further object of the present invention to provide a new and improved system and method for automatically precision machining a work piece which is independent of the geometry and design of the machining apparatus employed.

SUMMARY OF THE INVENTION

In accordance with the present invention, a system and method are disclosed for machining a work piece to precise, selectively determined dimensions. The term "machining" as used herein may apply simply to a cutting operation, i.e. to the removal of material from a specimen or work piece, or, in a larger sense, to the overall manufacturing process required to produce a finished work piece surface having desired dimensions. Hence, in its broad context, "machining" embraces the calibration of the tool when it is employed as a probe, the measurement of the work piece surface at various stages of the process and the automatic entry of compensating effects where required. In the present invention all of these steps are automatically carried out as needed. The operation can be performed quickly for each surface to be cut, thereby increasing the potential manufacturing capacity of the machining apparatus used.

In accordance with the principles of the present invention, the selected cutting tool has a further function as a tool touch probe. Acoustic vibrations are generated due to rapid relative motion between the tool cutting edge and a contacted surface. For probing purposes, this motion may be provided either by substantially continuous rotational or lateral motion of the work piece and tool with respect to each other, e.g. as is the case during machining on a lathe or a milling machine. Alternatively, rapid relative motion may be provided in the form of rapid reciprocating motion, e.g. by using an external vibrator device to induce vibrations in either the tool or the work piece. In either case, when contact is established between the cutting edge of the cutting tool and the surface in question, the vibrations are transmitted to the stationary member, whence they may be detected by a vibration sensing device mounted along an acoustic path (preferably a predominantly solid path) from the point of contact.

The calibration of the cutting edge is accomplished by contacting a reference surface in each axis with the cutting tool. Initial tool offsets are determined in each axis based on the deviation between the programmed and actual positions of the tool cutting edge upon contact with the corresponding reference surface. These offsets are entered into numerical control means and modify the subsequent machining of the work piece.

In a preferred embodiment of the invention, the cutting edge is again calibrated after machining is completed. Probing of the machined surface is carried out with the tool touch probe at least once before the finishing cut is taken. Appropriate offsets are again determined from the observed deviations and then are entered into the numerical control means. These latter offsets modify the operation controlled by the stored machining program so as to provide the finished surface with the desired dimensions when the cutting process is complete. Further probing may be carried out following the completion of the finishing cut in order to determine the actual dimensions of the finished surface and the extent to which deviations, if any, fall outside allowable tolerances.

The invention will become clear from the discussion below, when read together with the accompanying drawings in which applicable reference numerals have been carried forward.

DESCRIPTION OF THE INVENTION

Figure 1:
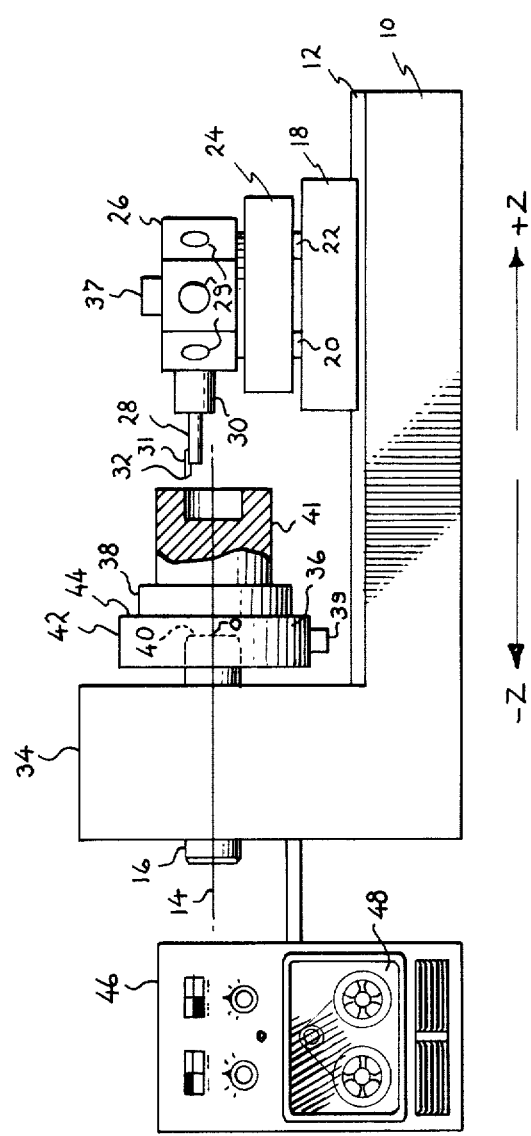
FIG. 1 is a simplified elevation view of an exemplary horizontal turret lathe whose rotatable turret is adapted to bring a plurality of cutting tools or probes into operating position.

With reference now to the drawings, FIG. 1 is a simplified elevation view of machining apparatus in the form of a horizontal turret lathe. Lathe frame 10 carries a pair of lateral ways which are mutually spaced in the X axis, i.e. in a direction normal to the plane of the paper. The lateral way which is visible to the viewer in the drawing is designated by the reference numeral 12. Althought the lathe bed so defined is horizontal in the illustrated embodiment, it will be understood that the invention is not so limited. One of the lateral ways may, for example, be raised above the other one to define a sloping lathe bed.

A saddle or lateral slide 18 is slideably disposed on the above-described lateral ways and is capable of being positioned in the Z axis in either a forward or a reverse direction from the position shown in FIG. 1. The Z axis is parallel to centerline 14 of lathe spindle 16 and positioning of saddle 18 along it is carried out by means of a lead screw arrangement which may be driven by a conventional DC positioning motor arrangement.

Saddle 18 carries a pair of ways 20 and 22 on which a cross slide 24 is slideably disposed so as to be capable of being positioned in the X axis, i.e. normal to the plane of the drawing. Positioning of the cross slide in the X axis is likewise carried out by means of a lead screw arrangement which may be driven by a DC positioning motor.

Each of the aforesaid electric motors, or the lead screws, may have a conventional resolver coupled thereto adapted to provide a feedback signal indicative or the rotary position of the corresponding component. These feedback signals are representative of the linear position of saddle 18 and cross slide 22 respectively in their respective axes. Alternatively, suitable electronic or opto-electronic encoding devices, such as a commercially available Inductosyn scale, may be used to provide signals directly representative of the linear position of saddle 18 and cross slide 24.

A turret 26 is carried by cross slide 24 and includes a plurality of tool locations 29, each capable of mounting a tool holder 30. The turret and the tool holder jointly constitute what is referred to as tool holding means herein. In the illustrated embodiment of the invention, turret 26 is capable of mounting six separate tools at tool locations 29. By appropriately indexing, i.e. rotating, the turret, each tool may be brought into operating position as shown in the drawing. For the sake of simplicity, turret 26 is illustrated as carrying only a single holder 30 and thus only one cutting tool 28 is shown. Tool 28 is shown with a tool insert 31 whose cutting edge 32 faces the work piece.

It will be clear that the invention is not limited to the use of a turret and that other types of tool holding means may be employed. For example, a tool magazine may be used which is capable of holding a relatively large number of tools that may be individually selected and advanced into operating position.

The illustrated lathe further includes a spindle drive and gear box 34 which is positioned on frame 10 at one end thereof. A rotatable spindle 16 carries a spindle chuck 36 which includes a set of jaws 38 for holding work piece 41. Spindle 16 includes a spindle nose or face 40 which abuts work piece holding means 36. The intersection of the plane of face 40 with spindle axis (centerline) 14 defines the origin position "0" from which the manufacturer of the paricular machine tool establishes machine element and cutting tool locating specifications for use in programming the system. While all program positions are referenced to the origin, the measuring system of the machine tool itself always counts or measures relative to a "home" position. The latter is normally located as far away from the spindle nose and centerline as saddle 18 and cross slide 24 are able to move. For example, if the home position is +26.0000 inches on the Z axis and +17.0000 inches on the X axis from the origin, a programmed move from home to the origin will be Z 26.0000 and X 17.0000, ignoring any allowance for the thickness of the chuck, tool length or distance from the centerline of turret 26 to the tool locating face. A digital position readout display on the machine will count from 0 to −26.0000 on Z and from 0 to −17.0000 on X. However, the programmed (selected) position will be counting in the opposite direction, from +26.0000 to 0 on Z and from +17.0000 to 0 on X.

Thus, the origin 0 provides a uniform point with respect to which the machine tools of various manufacturers may be programmed. However, the "home" position of different machine tools relative to origin 0 will vary depending on the size and type of the machine tool and its particular manufacturer.

Chuck 36 further includes at least a pair of position reference surfaces, or datum surfaces, which are normal to the X and Z axes respectively. Each of these surfaces is positioned at a known, calibrated distance from the position origin 0. Specifically, the external cylindrical surface 42 of the chuck constitutes one reference surface, while chuck face 44 provides another reference surface.

An acoustic vibration transducer 37 is mounted on top of turret 26. The transducer is of the type which is commercially available from Dunegan/Endevco Corp. under the designation D 9203A and it provides an electrical signal in response to sensed mechanical or acoustic vibrations. These vibrations are transmitted to the transducer when cutting edge 32 makes contact with rotating work piece 41. The rotation of the work piece relative to cutting edge 32 thus supplies the necessary rapid relative motion to produce vibrations. For probing purposes tool 28 is brought lightly into contact with the surface to be probed and is quickly backed away. The applied force is kept to a minimum to avoid cutting into the surface during the probing operation. Ideally, the transducer is positioned in relatively close proximity to the contact point, i.e. to the point on the cutting edge of the tool which makes contact with the rotating work piece and through which vibrations are transmitted to the transducer. However, in most instances this is not an important consideration. Thus, although transducer 37 is shown positioned on top of turret 26 in FIG. 1, the invention is not so limited and the transducer may also be stationed in other locations, e.g. at a tool location 29, on tool holder 30, or on the cross-slide. This is also true for the case where the transducer is responsive to air-carried sonic vibrations, rather than to vibrations transmitted through a largely solid path.

Unit 46, which is referred to as numerical control means herein, is electrically coupled to a number of different points in the system, e.g. to the DC positioning motors, the resolvers, and to transducer 37 among others. Unit 46 is seen to include a tape transport 48 in the illustrated embodiment of the invention. The tape stores the numerical control program for machining the work piece in the form of code words representative of different kinds of instructions. For example, the program may be used to index turret 26; to turn on the coolant required for machining; to rotate the spindle in a selected direction and at a selected speed; to move the probe or the tool in a particular sequence of steps for calibration, measuring, or cutting purposes by positioning saddle 18 and cross-slide 22; and for various other related purposes. The tape may also contain various data, such as the desired dimensions of a particular surface which is to be machined, the allowable machining tolerance for each dimension and certain parameters that must be taken into consideration depending on the part which is to be machined, the particular tool or tools to be used, etc.

In a preferred embodiment of the invention, numerical control means 46 may incorporate a computer, e.g. a microcomputer which responds to the stored words on tape. The microcomputer then causes the appropriate control signals to be issued, e.g. to the DC positioning motors which will give effect to the tape commands. The microcomputer is also responsible for processing the data acquired through various probing operations and for computing offsets which may produce modifications of the cutting operations carried out by the machining program. All of these functions may be carried out instead in a remotely positioned computer, e.g. in the central computer of a distributed numerical control system, so that the processed data is fed to unit 46, which then generates the appropriate control signals. In such an arrangement some computing capability may be retained in numerical control means 46.

The data received from the probing operations, feedback data from the resolvers and data loaded in through the program itself, is processed by the microcomputer to compute the aforesaid offsets. Motor control signals derived from the processed data are compared against the position feedback data received from the respective motor resolvers or from other position feedback means. A closed loop system is thus established in which the differential determined upon comparison of the two signals controls the position of the cutting edge of the tool or the position of the measuring probe. Unit 46 may also be used to compute, display and print the physical dimensions of the work piece, as well as to compute deviations from the programmed values and display the appropriate allowable machining tolerances. In a preferred embodiment of the invention, unit 46 is implemented in the form of apparatus which is commercially available from General Electric Co. under the designation Mark Century ®, Model 1050 Microprocessor Numerical Control.

The apparatus discussed thus far requires contact between the cutting edge and the continuously rotating work piece for machining and probing. Under certain conditions, where marks on the finished work piece cannot be tolerated, the work piece may be rotated in the reverse direction for probing. Even with such an arrangement the finished work piece surface may be marred, however slightly, by its contact with the cutting edge. An alternative arrangement is shown in FIG. 1, where a vibrator 39 is seen to be mounted on chuck 36. Vibrations in the form of rapid reciprocating motion of small amplitude are induced in the chuck when vibrator 39 is actuated. These vibrations are transmitted to work piece 41, to tool 28 and then to transducer 37 through the tool holding means comprising tool holder 30 and turret 26. Thus, rapid relative motion between the cutting edge of the tool and the work piece surface is now provided by the small amplitude reciprocating motion induced in the work piece by the vibrator, rather than by the rotation of the work piece. In a preferred embodiment of the invention, rotation of the work piece is halted during probing while vibrator 39 is in use.

The present invention is not limited to a horizontal, 2-axis turret lathe, as shown in FIG. 1. The lathe bed may be angled, as previously explained, and the lathe itself may be capable of motion in more than one axis. Further, the work piece holding means and the tool holding means may be capable of motion relative to each other in a manner other than that shown by the perpendicularly disposed Z and X axes in FIG. 1. In a broader sense, the invention is not limited to lathes, but is also applicable to other types of machine tools, for example to milling machines, or milling/machining centers as they are sometimes referred to.

Figure 2:
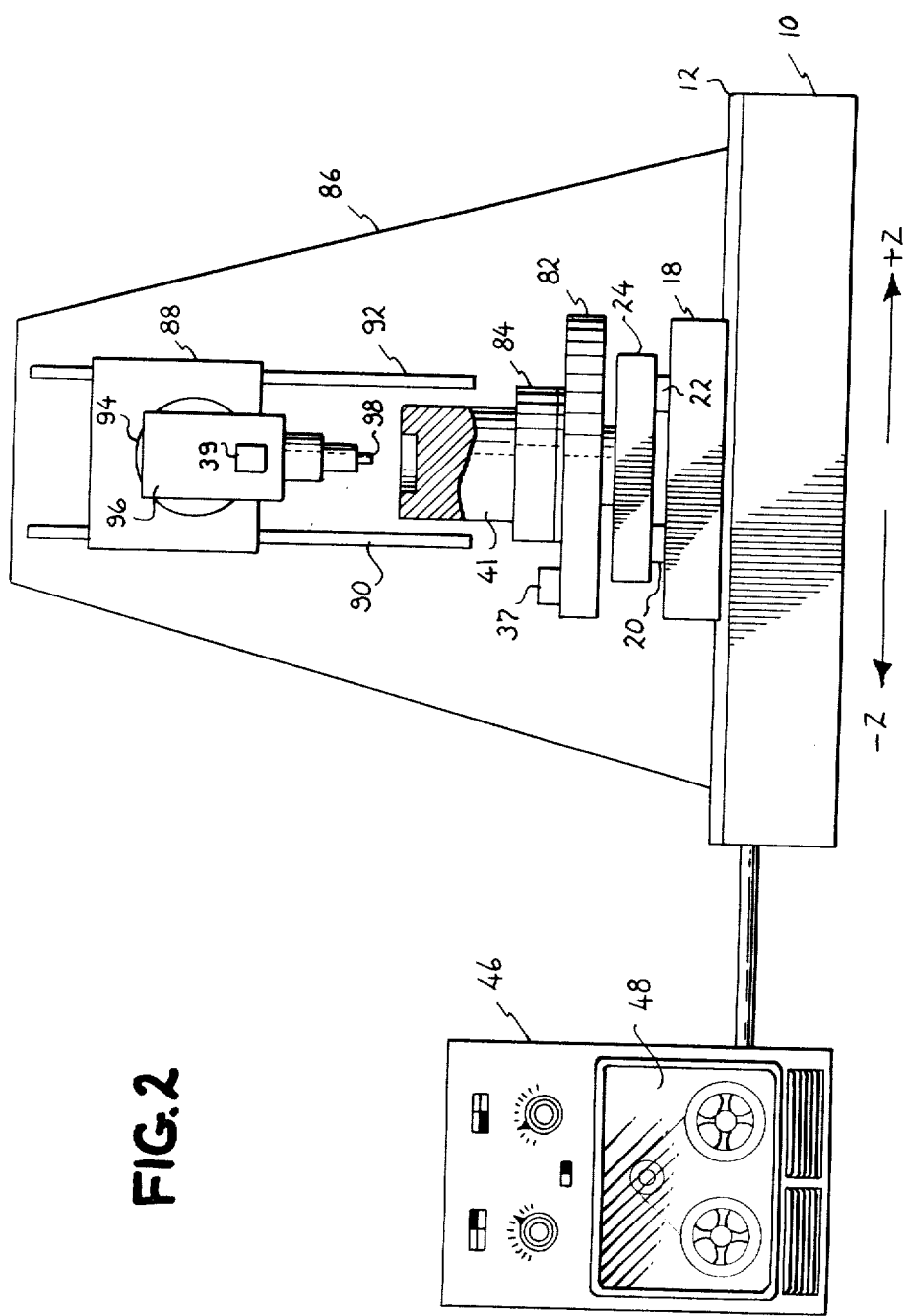
FIG. 2 is a simplified elevation view of a multi-axis milling machine.

FIG. 2 illustrates a milling machine in simplified elevation view, applicable reference numerals having been carried forward from FIG. 1. Numerical control means 46 is shown schematically connected to the milling machine and in a broad sense it performs the same functions as it does with respect to the lathe discussed above. It will be clear, however, that the specific signals generated and received by unit 46 will depend on the particular machine tool which is controlled.

Machine frame 10 carries a pair of lateral ways which are mutually spaced from each other in the X axis, i.e. in a direction normal to the plane of the paper. Lateral way 12 alone is visible in the drawing. A lateral slide 18 is slideably disposed on the lateral ways and is capable of moving in either direction in the Z axis. A cross-slide 24 is slideably disposed on a pair of ways 20, 22 and is capable of moving back and forth in the X axis which is normal to the plane of the drawing in FIG. 2.

A rotary table 82 is positioned on cross-slide 24 and is capable of rotating around a vertical axis extending through the center of the table. In an alternative embodiment, table 82 may be fixedly mounted to cross-slide 24. Work piece 41 is held on tabe 82 by means of jaws or other special clamps or fixtures 84 whose precise configuration may depend upon the configuration of the work piece itself.

A vertical machine frame 86 extends upward from horizontal frame 10 and is affixed to, or integral with, the latter. Vertical frame 86 includes a vertical slide 88 which is capable of moving up and down in the elevation view of FIG. 2 along a pair of schematically illustrated guides or ways 90, 92. Vertical slide 88 carries an angular swivel 94 on which a spindle 96 is located together with the spindle drive. As shown in the drawing, a milling cutter tool 98 is positioned for rotation around a vertical axis. However, rotation about a horizontal axis is readily achievable by appropriately positioning angular swivel 94 around the swivel axis, or by a forward-facing spindle drive. It will be clear that the full freedom of motion illustrated in FIG. 2 need not all be present in each milling machine used. Hoever, it is shown here to demonstrate the multiple axes of motion that are possible.

Rapid relative motion between the cutting edge of cutting tool 98 and work piece 41 is provided by continuously rotating the cutting tool around the tool axis, i.e. around the vertical axis in the arrangement shown in FIG. 2. Machining is carried out with the cutting tool in contact with work piece 41. Tool touch probing may be likewise accomplished in this manner if some marring of the finished work piece surface can be tolerated. A reduction of marring will result if the tool is counter-rotated during probing.

Further improvement will result from the use of a vibrator, preferably when the rotation of tool 98 is halted. In FIG. 2 vibrator 39 is shown positioned on spindle 96. Alternatively the vibrator may be positioned on angular spindle swivel 94, on verticl slide 88, or on the vertical frame. In either case, the reciprocating vibrations produced by the vibrator are induced in cutting tool 98 and they are transmitted to work piece 41 when the cutting tool makes contact with the latter.

Transducer 37 is shown positioned on table 82. The transducer may also be located on other components, such as clamps 84, or even on work piece 41. In the location shown, the transducer will receive the vibrations induced in the work piece when cutting tool 98 makes contact with it, such vibrations being transmitted through work piece 41, clamps 84 and rotary table 82.

It should be noted that the respective positions of vibrator 39 and transducer 37 are generally reversed in FIG. 2 over the system shown in FIG. 1. Specifically, in the lathe arrangement of FIG. 1 the vibrator induces vibrations in the work piece, either directly or through intermediate components such as the chuck 36 and the chuck jaws 39, and the transducer is located on the tool holding means. In the milling machine on the other hand, the vibrator is located to induce vibrations in the cutting tool directly or through intermediate components. These vibrations are then transmitted to the transducer through work piece 41, clamps 84 and rotary table 82.

It is generally desirable to induce vibrations in a manner whereby reciprocating motion occurs along the same axis in which contact is made between the work piece and the cutting edge. Transducer 37 is then oriented to maximize its receptivity to the vibrations in that axis. However, the invention is not so limited and different orientations may be dictated by the geometry of the machine tool and work piece. It may also be desirable to mount two vibrators, one to induce vibrations in the Z axis and the other one to induce vibrations in the X axis. Under these conditions, two transducers may be advantageously used.

The vibrator itself may be implemented in a number of different ways, e.g. electromechanically, pneumatically, by means of rotary equipment, through an acoustic siren, by means of a bending member tapper, by manual hammering, by capacitive discharge, by electromagnetic pulsing, etc. The selection of the particular vibrator will depend largely on physical access, which is itself governed by the configuration of the work piece and the machine tool. Vibrator selection will also vary with the desired intensity of vibration at the tool contact point.

Figure 3:
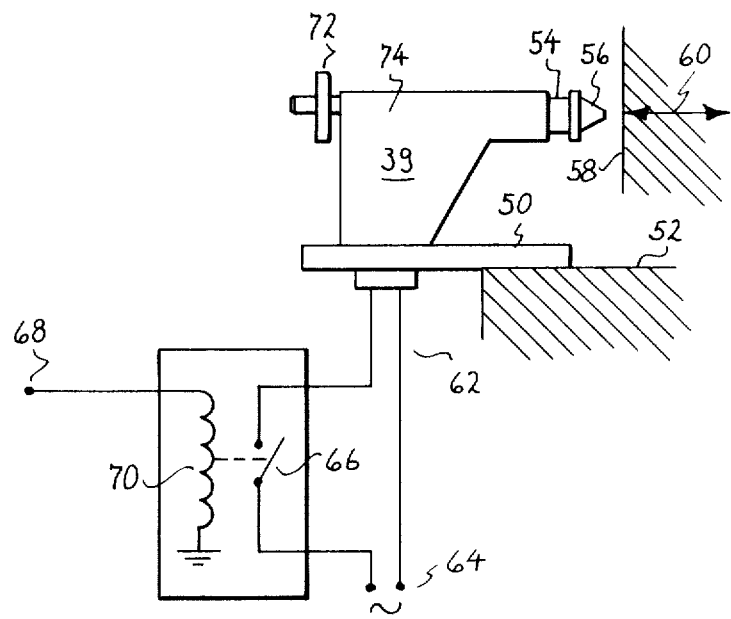
FIG. 3 illustrates an external vibrator of the type that may be used with the apparatus of FIGS. 1 and 2.

FIG. 3 illustrates an exemplary electromechanical vibrator 39 having a base 50 fastened to a mounting 52. The mounting may, for example, include chuck 36 in FIG. 1, or spindle 96 in FIG. 2. A rod 54 is axially oscillated, i.e. it is reciprocated by a solenoid motor or the like located within vibrator 39. The hardened contact tip 56 of the vibrator then makes intermittent contact with surface 58 of the object in which vibrations are to be induced. The selected frequency of rod oscillations may vary from 10 to 1000 strokes per second in the example under consideration. It in turn determines the induced vibration frequencies which may vary from 16 to 300 KHz. By varying the stroke of the vibrator the amplitude of the induced vibrations may be varied.

The direction of reciprocation is indicated by arrow 60. A pair of leads 62 connects the solenoid motor of the vibrator to an AC source of excitation 64, which may be a 110 volt AC power line. A switch 66 is connected in series with one of the lines to respond to on/off control signals applied to terminal 68 of a relay 70. The latter signals may be provided by numerical control means 46. Reference numeral 72 designates an adjustment setting by means of which the frequency of vibration and the magnitude of the stroke may be controlled.

Figure 4:
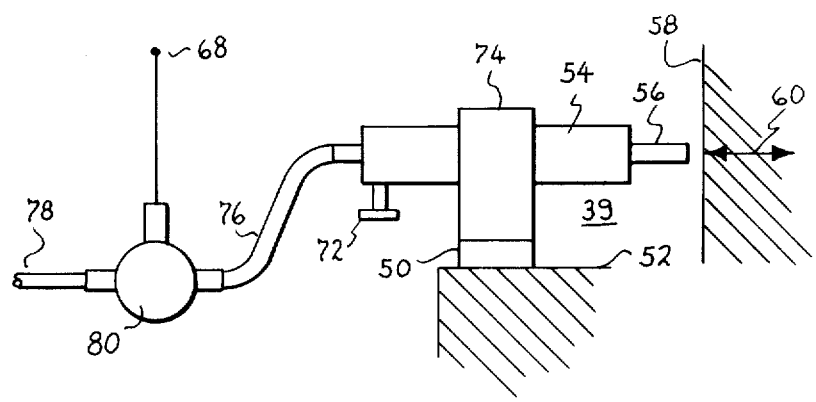
FIG. 4 illustrates another embodiment of an external vibrator.

FIG. 4 illustrates another embodiment of a vibrator 39 wherein applicable reference numerals have been carried forward from FIG. 3. The device shown works as a pneumatic vibrator, and it includes a rod 54 which is supported by a bracket 74. The latter is positioned on base 50, which is in turn located on mounting 52. Vibrator rod 54 is caused to reciprocate at a desired frequency and stroke in the direction shown by arrow 60. As before, vibrator tip 56 intermittently contacts surface 58 at the rate of vibration.

In the illustrated embodiment under discussion, vibrator rod 54 is actuated from an air supply hose 76 which is coupled to an air supply 78 by way of an air valve and regulator 80. The operation of the air valve is determined by on/off control signals provided on terminal 68 and derived substantially as discussed in connection with FIG. 3. The frequency of vibration and the stroke of tip 56 are controlled by a rate and stroke adjustment knob 72.

The vibrators illustrated in FIGS. 3 and 4 may be implemented as slightly modified commercially available equipment. In operation, each vibrator is actuated such that vibration is provided at the desired frequency and stroke. The vibrations so induced in surface 58, e.g. in chuck 36 in FIG. 1, are then transmitted to the contiguous structure, such as chuck jaws 38 and work piece 40. When contact occurs between the work piece and cutting edge 32 of tool 28, the vibrations are further transmitted through the tool to tool holder 30 and chuck 36 and then to transducers 37. Upon detection by the transducer, a responsive electrical signal is generated.

Electrical power transmission to the vibrator may be implemented either by direct cabling, or by means of slip rings and brushes suitably positioned to maintain contact during motion of the machine tool in any axis. Similarly the small power level required by the circuit shown in FIGS. 6 and 7, as well as the output signal of that circuit, may be transmitted through slip rings. Alternatively, power inputs or signals may be transmitted optically, inductively, or by radio.

Figure 5:
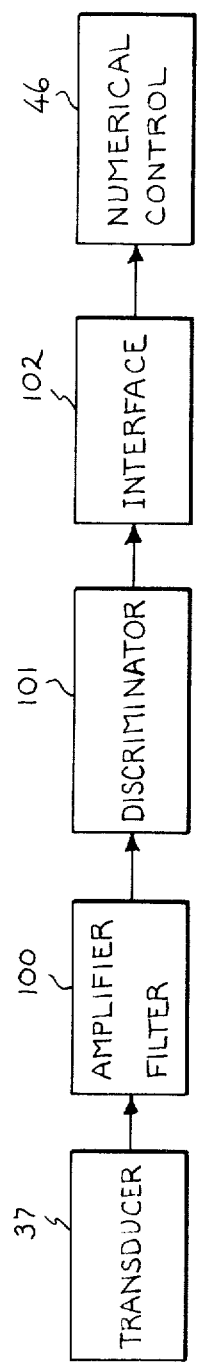
FIG. 5 illustrates in block diagram form the electrical signal path between the acoustic transducer means and the control means.

FIG. 5 illustrates in block diagram form the electrical path between transducer 37 and numerical control means 46 for signals produced when vibrations are sensed by the transducer. As shown, the transducer signal is applied to an amplifier/filter 100 whose function it is to provide amplification and band-pass filtering. The output signal of unit 100 is coupled to a discriminator 101, which discriminates against spurious signals generated by sources other than the tool-probing vibration source. As discussed in greater detail below, signal discrimination is carried out on the basis of predetermined time domain characteristics and is accomplished by the use of two or more separate channels. The touch-indicating pulse signal at the output of unit 101 is applied to numerical control means 46 through an interface 102. In addition to providing the appropriate match to the outside world and to unit 46, the interface imposes the concurrence of "success" signals in both channels as a condition to the generation of a tool touch signal.

FIGS. 6A, 6B and 7A, 7B, 7C jointly illustrate in greater detail the various units shown in block diagram form in FIG. 5. Connections between the circuit portions shown in different Figures are indicated by identical reference numerals so that the separate drawings of FIGS. 6 and 7 respectively need not be specifically called out each time. As stated above, transducer 37 typically comprises a piezo-acoustic emission transducer, i.e. a charge producing device which responds to sensed vibrations. The transducer may be grease coupled to the machine component on which it is positioned, i.e. turret 26 in the lathe shown in FIG. 1, in order to transmit vibrations in the form of acoustic frequency waves from the turret to the transducer. However, a liquid, a semi-liquid, or a soft solid may be substituted for the grease coupling, provided only that the vibrations are readily passed through. The transducer is clamped in position, e.g. by a spring or the like, in order to keep it in place. This constant pressure on the transducer may produce a DC voltage level which must be blocked, e.g. by capacitors.

A balancing circuit 99 is connected to the transducer terminals in FIG. 6A and includes a pair of capacitors 105A and 105B which provide the aforesaid blocking function with respect to the DC voltage level. A pair of Zener diodes 103A and 103B is connected between capacitors 105A and 105B respectively and ground. These diodes serve as protective devices and are required by the gain of the subsequent circuit, which may approach 200 in a preferred embodiment of the invention. The diodes are preferably selected to cut off in the vicinity of the 6 volt level. Signals exceeding 6 volts are typically generated by sources other than the vibrations transmitted through contact between the tool cutting edge and the work piece, e.g. by sudden impact. For example, the dropping of an object, perhaps on transducer 37 itself, may produce signals as high as thousands of volts. Since signals of such amplitude tend to swamp the subsequently connected circuits, they are preferably shorted out.

Balancing circuit 99 is coupled to a differential input amplifier circuit 104, which has a natural bypass characteristic of approximately 300 KHz. Circuit 104 includes a pair of amplifiers 111 and 112 which are connected to receive the output of circuit 99. Each of these amplifiers has a high input impedance which may be on the order of $1 \times 10^9$ ohms. A high impedance is needed because of the low current generated by charge producing transducer 37. The circuit is selected so that amplifiers 111 and 112 have a very low idle current drain. This becomes particularly important when the invention is battery operated, as is occasionally necessary in the field.

Amplifiers 111 and 112 are both set to have unity gain. This gain is established by resistors 144 and 145 for amplifier 111, each preferably haviang a value on the order of 10,000 ohms. Corresponding resistors provide the unity forward gain in amplifier 112. Both amplifiers are frequency compensated in order to improve the high frequency roll-off at unity gain in the normal frequency range, which may extend from 10KHz–500 KHz. Capacitors 140, 141 and 143, the latter in conjunction with resistor 142, established amplifier 111 as a feed forward compensated amplifier. Amplifier 112 likewise has a feed forward characteristic determined by corresponding associated circuitry.

The outputs of amplifiers 111 and 112 are coupled to the inputs of a summing amplifier 110 by means of a pair of capacitors 108 and 109 respectively and associated series resistors. The function of these capacitors is to block any DC bias from the input of summing amplifier 110, which may have a gain on the order of 200. In a preferred embodiment of the invention, amplifiers 111, 112 and 110 and their associated circuitry jointly form a low pass filter which cuts off in the range of 300 KHz.

The output of the summing amplifier is capacitively coupled to the input of a 2-pole filter circuit 113, which includes an amplifier 146. Circuit 113 is a 16 KHz high pass, active filter which is preferably selected to have a 12 db per octave roll-off. Thus, differential input amplifier circuit 104, together with high pass filter circuit 113 forms a band pass filter having a band width which extends from 16 KHz to 300 KHz. The low end of the pass band is chosen to capture vibrations from titanium based alloys which selectively attenuate the higher frequencies. Frequencies up to 300 KHz are passed more readily by nickel alloys, steel, aluminum and the like. Thus, the circuit connected between transducer 37 and output point 147 of filter circuit 113 converts the acoustic vibrations of the transducer into electrical signals, removes any DC offset, clips signals of excessive amplitude, amplifies and filters out frequencies that fall outside the 16 KHz–300 KHz pass band. It will be understood that the invention is not limited to the recited parameters, which represent empirically determined values.

Figure 6B:
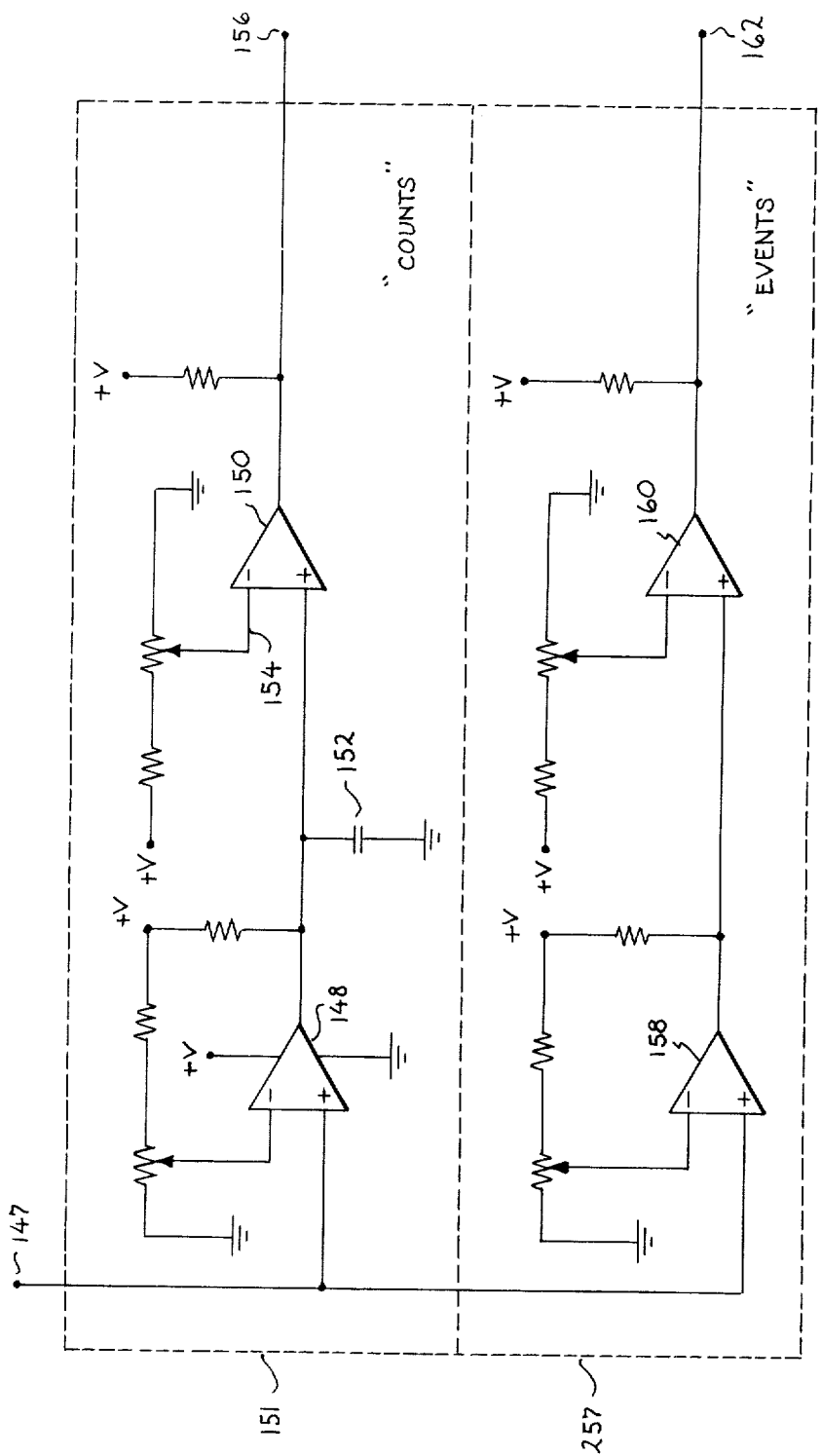
FIGS. 6 and 7, consisting of FIGS. 6A, 6B and 7A, 7B, 7C respectively, jointly illustrate the details of an exemplary amplifier/filter circuit, a discriminator circuit and an interface of the type shown in block diagram form in FIG. 5.

The analog signal appearing at output point 147 of amplifier 146 feeds two separate channels, i.e. a "counts" channel 151 and an "events" channel 257 in FIG. 6B. Various thresholds are set in these channels, examples of which are given below. It will be understood that the values stated herein are exemplary only and they are not intended to be limiting. In general, the selected thresholds are referenced to a 12 volt power supply. However, the illustrated circuit is not so limited and it is also capable of being powered by a 6 volt battery. In the latter case the thresholds are referenced to a 6 volt standard.

All oscillations greater than a pre-determined amplitude are passed through counts channel 151. This channel further includes a voltage comparator 148 connected at the channel input, together with associated circuitry. The function of voltage comparator 148 is to clear the baseline of any internally induced electronic noise in order to provide a zero DC voltage level for the applied analog signal and to convert positive-going analog signal excursions to corresponding digital pulses. For this purpose its threshold is set very low, e.g. in the vicinity of 100 mv.

The output of voltage comparator 148 is directly coupled to one input of a further voltage comparator 150 and may be influenced by an optional smoothing capacitor 152. The selectively obtained digital pulses are applied to one input of voltage comparator 150. A second input 154 sets a low level threshold selected to be 0.2 volt, referenced to the 12 volt power supply. The latter threshold is effective to screen out ambient acoustic noise occurring in the vicinity of the machine tool and to pass touch-related pulses for totalizing. In particular, it is desired to discriminate against pulses produced by vibrations of the type that are typically generated when the machine tool is running idle. Thus, the digital pulses applied to the input of voltage comparator 150 are converted to digital pulses representative of all vibrations of an amplitude greater than the chosen low amplitude threshold. This digital pulse signal appears at circuit point 156 of the counts channel, which is further connected to the correspondingly designated connection in FIG. 7A.

Events channel 257 includes voltage comparator 158 and its associated circuitry, which likewise functions to clear the baseline of any internally induced electronic noise. Optionally, it may be one and the same as voltage comparator 148. Here again, the digital pulses provided at the voltage comparator output has substantially zero DC voltage level, its threshold being set in the vicinity of 100 mV. A voltage comparator 160 has one input coupled to the output of unit 158, its other input being connected to a variable voltage source. The voltage level of the latter is set to provide a high threshold of 1.0 volt, referenced to the 12 volt power supply. Thus, only vibration-originated digital pulses having amplitudes in excess of 1.0 volt appear at the output of voltage comparator 160, the latter being further coupled to circuit point 162 in FIGS. 6B and 7B. Thus, the events channel functions to seek out the peaks of only the largest vibrations and to discard all others. As a result, the incoming digital pulses are converted to a signal that includes only pulses that exceed the selected high level threshold. It is these pulses which are the most likely to be generated when an actual tool touch condition occurs, as opposed to machine motion background vibrations. Hence, the high level threshold enhances the probability of detecting an actual tool touch condition.

The two voltage threshold functions which are performed extract at least two different pieces of information from these signals, i.e., counts and events. A count may be defined as a pulse that exceeds a selectively determined, low voltage level which is greater than the level attributable to ambient acoustic noise in the vicinity of the machine. An event may be defined as a pulse which exceeds a selectively determined high voltage level, set to exceed the amplitude of vibrations produced by non-tool touch conditions, such as machine motion vibrations, work piece/tool cooling fluid flow, metal chips hanging about the tool, or vibrations from any other source not directly related to true tool touch.

In FIG. 7A, circuit 116 constitutes a clock circuit which has a selected 1 msec period in a preferred embodiment of the invention. Its reset time (off-time) is on the order of 20 usec. The heart of clock circuit 116 is a dual monostable multivibrator 266 which, once started, enables circuit 116 to set up a continuous series of 1 msec count windows whose function will become clear from the discussion below. The inverted output 268 of multi-vibrator 266 is coupled to a 12 bit binary counter 164 in a "total count" circuit 118, as well as to a significant events counter 270 in circuit 125, and to an event clock counter 123 in circuit 122. The non-inverted output 167 of multivibrator 266 is coupled to an event clock 121 in circuit 120 for purposes of count window control.

Counter 164 receives digital counts channel pulses from connecting point 156. This counter may be logically implemented in a number of different ways by means of different selected arrangements of the illustrated jumper connections and the subsequently shown logic arrangement. For example, counter 164 may operate to decrement from a preset count, or to increment to a preset count. Alternatively, the input signals applied may be counted and the count values ORed to provide a "greater than" or "equal to" condition. Finally, counter 164 may be implemented in a manner whereby the counts are counted and the outputs of the counter ANDed to get an "equal to only" condition. Whatever logical implementation is chosen, a counts channel success signal is generated on output 119 when a predetermined count threshold, e.g. a count of 80 in one embodiment of the invention, has been satisfied. The latter signal constitutes a switch of the logic level at point 119, from logic 0 to logic 1, which persists from the time of satisfaction until the end of the count window.

The essential component of circuit 120 is event clock 121, which takes the form of a dual monostable multivibrator. In a preferred embodiment of the invention, the clock has a 50% duty cycle and a frequency on the order of 20 KHz. Thus, the clock period has a duration on the order of 50 usec, which allows a maximum of 20 event clock pulses within the 1 msec time frame of the count window.

Unit 121 receives digital pulses from events channel 157 via connecting point 162. These incoming events channel pulses allow the event clock to oscillate only while a positive-going excursion exists. Hence, the output of event clock 121 is a series of small groups of pulses that occur during the count window. The number of clock pulses in each group is proportional to the duration of the positive events channel pulse which corresponds to that group.

Counter 123 in circuit 122 is coupled to the output of event clock 121. This is a 12 bit binary counter whose output circuitry may be selectively implemented in any one of four possible arrangements, in similar manner to the corresponding circuit of counter 164 discussed above. The count obtained is in effect determined by the cumulative length of time during which events channel pulses are received at connecting point 162. The output pulses appearing at output 124 of circuit 122 may be characterized as significant event pulses. One such pulse is generated whenever a predetermined count threshold is satisfied. That threshold, which may be equal to a count of 8 in an exemplary embodiment of the invention, is determined by the connected circuitry between counter 123 and output 124. The latter circuitry may follow one of the four logic circuit connecting arrangements discussed in conjunction with circuit 118.

The significant events pulses are coupled to one input of significant events counter 270 in circuit 125. A further input of counter 270 is connected to output 268 of multivibrator 266 which, as explained above, applies the aforesaid count window. The outputs of counter 270 may be selectively connected in accordance with one of the four logic circuit connecting arrangements discussed above. Whenever the count threshold determined by the selected connection is satisfied, a counts channel success signal is generated on output 126 in the form of a logic level switch from logic 1 to logic 0, which persists from the time of satisfaction until the end of the count window.

Figure 7B:
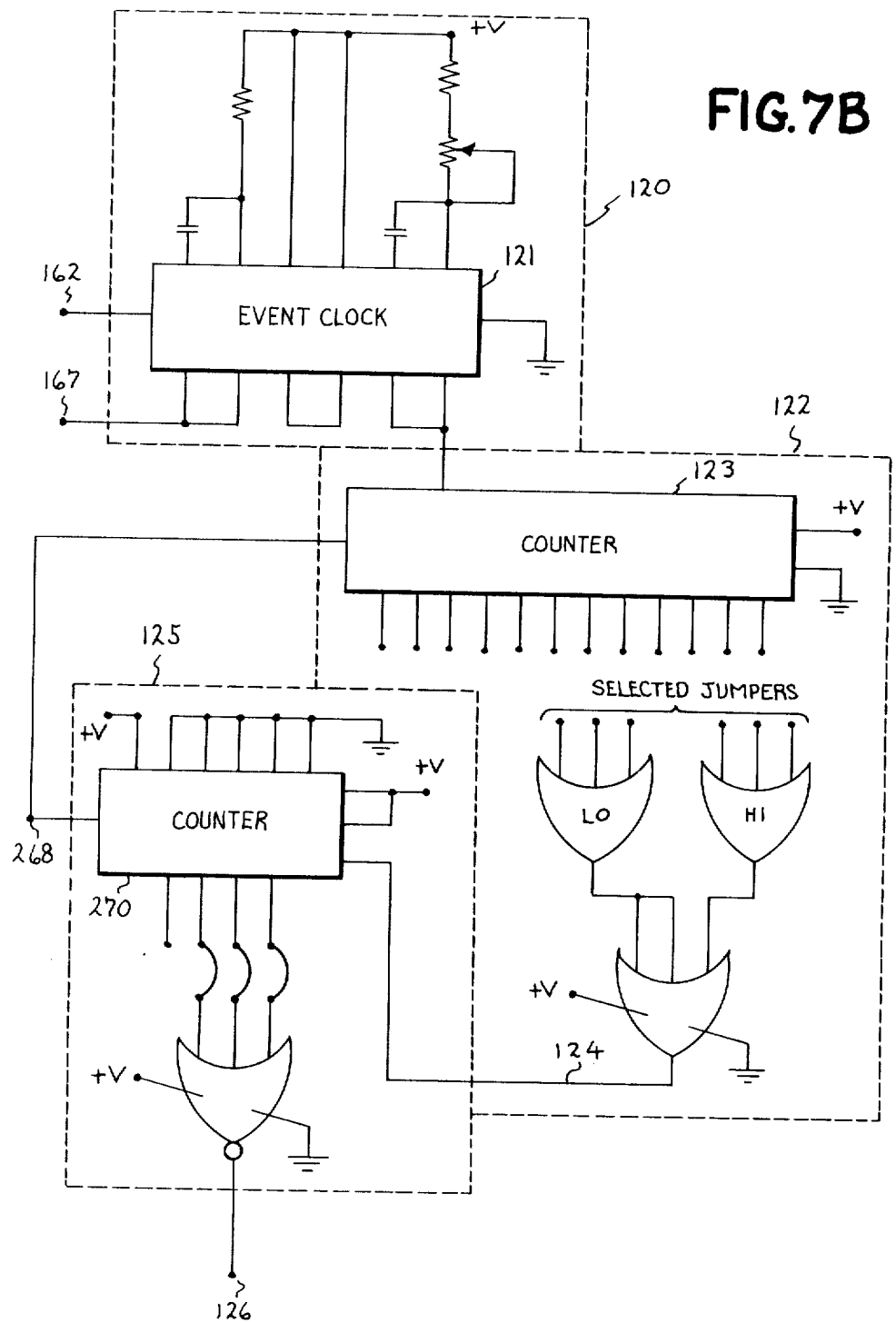

It will be clear that the circuitry illustrated and discussed above discriminates against spurious signals on the basis of time domain characteristics. The result of such discrimination is the generation of the above-discussed channel success signals. The events channel success signal appearing at circuit point 126 in FIG. 7B is coupled to a dual monostable multivibrator 128 in FIG. 7C, which is further connected to receive a counts channel success signal from circuit point 119 in FIG. 7A. In a preferred embodiment of the invention, unit 128 is connected to have one of its phases pacified so as to provide essentially single monostable multivibrator operation. Its period is selected to have a non-critical duration on the order of 0.5 seconds. The duration must be of sufficient length to permit a visual or audible indication of tool touch to occur and to be observed by the operator. The length of this period also limits the number of times, and therefore the time burden during the measurement cycle, that the program in the numerical control unit must respond to tool touch signals. The period of multivibrator 128 is initiated if and only if channel success signals appear at outputs 126 and 119 substantially at same time within one count window period. The other three Boolean "AND" conditions are discriminated against and each constitutes a no-touch condition. In the illustrated embodiment of the invention, unit 128 provides an edge-triggered AND circuit. Hence, one channel success signal must lead the other one to prepare for the edge-triggering of this multivibrator. Where CMOS integrated circuits are used, the minimum lead time is on the order of 1 usec.

The output of unit 128 is coupled to control unit 46, as well as being used to provide a visual or an audible signal, e.g. a light or a buzzing sound. Such a signal indicates to the operator the occurrence of tool touch, i.e. contact of the tool cutting edge with the work piece or with the reference surface. Since unit 128 has insufficient power to drive these subsequently connected circuits, an interface driver 129 must be used. In an exemplary embodiment, driver 129 may comprise CMOS-to-bipolar circuitry.

As illustrated in the drawing, one output of interface driver 129 is connected to a light emitting diode 130 which is resistively coupled to a positive voltage source. A buzzer may be substituted if desired. A further output is connected to a transistor circuit 131 which may drive a TTL input of the numerical control means to provide a TOUCH signal to the latter. The last mentioned output of driver 129 is also connected to a transistor circuit 133. In the illustrated embodiment of the invention, circuit 133 is adapted to provide a TOUCH signal to a circuit board of the aforesaid Mark Century ® Model 1050 Microprocessor Numerical Control unit.

A "touch signal enable" circuit 132 is coupled to the "CLEAR" function input of multivibrator 128. Circuit 132 includes a transistor 135 connected to a light emitting diode 137. The enable signal applied at input 134 of circuit 132 may be derived from the aforesaid Mark Century ® 1050 unit and its presence is required for a touch signal to be generated. The enable signal is generated once the tool has entered its final approach phase, immediately prior to probing a surface. The existence of the enable condition is indicated to the operator when diode 137 lights up.

Although the tool feed rate during the final probing phase is low, prior to the final phase the numerical control means sets a rapid feed rate until the tool comes close to the surface it is approaching. The rapid feed rate tends to create motion-related vibrations which are capable of causing transducer 37 to produce false tool touch indications. Therefore, the numerical control program provides a signal disable function until the approach feed rate has slowed to a rate on the order of 1 inch/minute. It is only at that point that the enable signal, which simultaneously activates light emitting diode 137 to provide a visually observable condition indication to the operator, is applied to multivibrator 128 and allows it to generate the appropriate "TOUCH" and TOUCH signals, provided the above-discussed tool touch signals are simultaneously present at the multivibrator inputs. Further, light emitting diode 130 is activated to provide a visual indication of the existence of the tool touch condition.

As previously stated, the various thresholds and other criteria established for the circuit illustrated in FIGS. 6 and 7 and described above are determined on the basis of pragmatic considerations and they may vary for different circuit parameters and different circuit configurations. Similarly, the invention is not limited to the precise circuit configuration shown and various modifications of the transducer, amplifier/filter, discriminator and interface circuitry will occur to those skilled in the art. For example, it will be apparent that the event counting function performed by circuits 120 and 122 during the time frame provided by the count window is essentially an integration function. Accordingly, an analog time integrator may be substituted to carry out that desired function.

With the foregoing discussion in mind, it is now useful to describe the method of operation of the system in broad terms first, before proceeding to individual operations and specific steps thereof. In the subsequent discussion, reference will be had to machining and probing operations performed in conjunction with the apparatus shown in FIG. 1. Various steps of the operation are explained with reference to FIGS. 8 to 15.

Various types of calibration/measuring operations are performed in conjunction with the cutting operation when a single surface of a work piece is machined. Among these are the calibration of cutting edge 32 of tool 28, which is preferably carried out immediately preceding each use of a particular tool as a probe. Using the apparatus shown in FIG. 1 as an example, the calibration is performed with the turret indexed, i.e. rotated around its own axis to the position shown in FIG. 1. Cutting edge 32 is thereby placed in position for tool touch probing of reference surfaces 42 and 44 in the Z and X axes respectively. In order to probe reference surface 44, cross-slide 24 is moved in the X axis (normal to the plane of FIG. 1) using a rapid approach feed rate. This movement is carried out under the control of control unit 46 until cutting edge 32 is positioned in line with surface 44. Likewise, rapid approach feed is used to move saddle 18 in the Z axis as directed by control unit 46, to position the cutting edge to the vicinity of surface 44. In an exemplary embodiment of the invention, the approach feed rate may start out at 100 inches/minute, then slow down to 40 and subsequently 10 inches/minute, followed by a slow feed rate on the order of 1 inch/minute which is used during the actual tool touch operation.

As already explained, the numerical control means generates a disable signal while the fast feed rate obtains to prevent transducer 37 from producing false tool touch indications resulting from high amplitude motion signals. When the feed rate of the tool has slowed down, e.g. to 1 inch/minute, an enable signal is issued. In order for the tool touch condition represented by the concurrence of signals at outputs 119 and 126 to be recognized, the enable signal must be present, i.e. a tool touch signal can be generated only if an enable signal is present.

If vibrator 39 is used to induce reciprocating vibrations in reference surface 44, the rotation of this surface is preferably (though not necessarily) halted during probing for calibration purposes. If no vibrator is used, vibrations for calibration probing are produced by the contact of the tool with the rotating surface.

Positioning in the Z axis under numerical control continues at the slow feed rate until cutting edge 32 establishes contact with rotating (or reciprocating) surface 44. The duration of contact is brief in order to minimize, or to avoid altogether, marring of the surface. It is particularly important to keep this time interval, which is controlled by control means 46, short when the surface is rotating. In this context it should be mentioned that the lathe is preferably capable of rotating the work piece in a forward as well as a backward direction. Marring of the work piece surface can be materially reduced if the work piece is rotated in a direction opposite to that used for cutting when tool touch occurs.

Figure 7C:
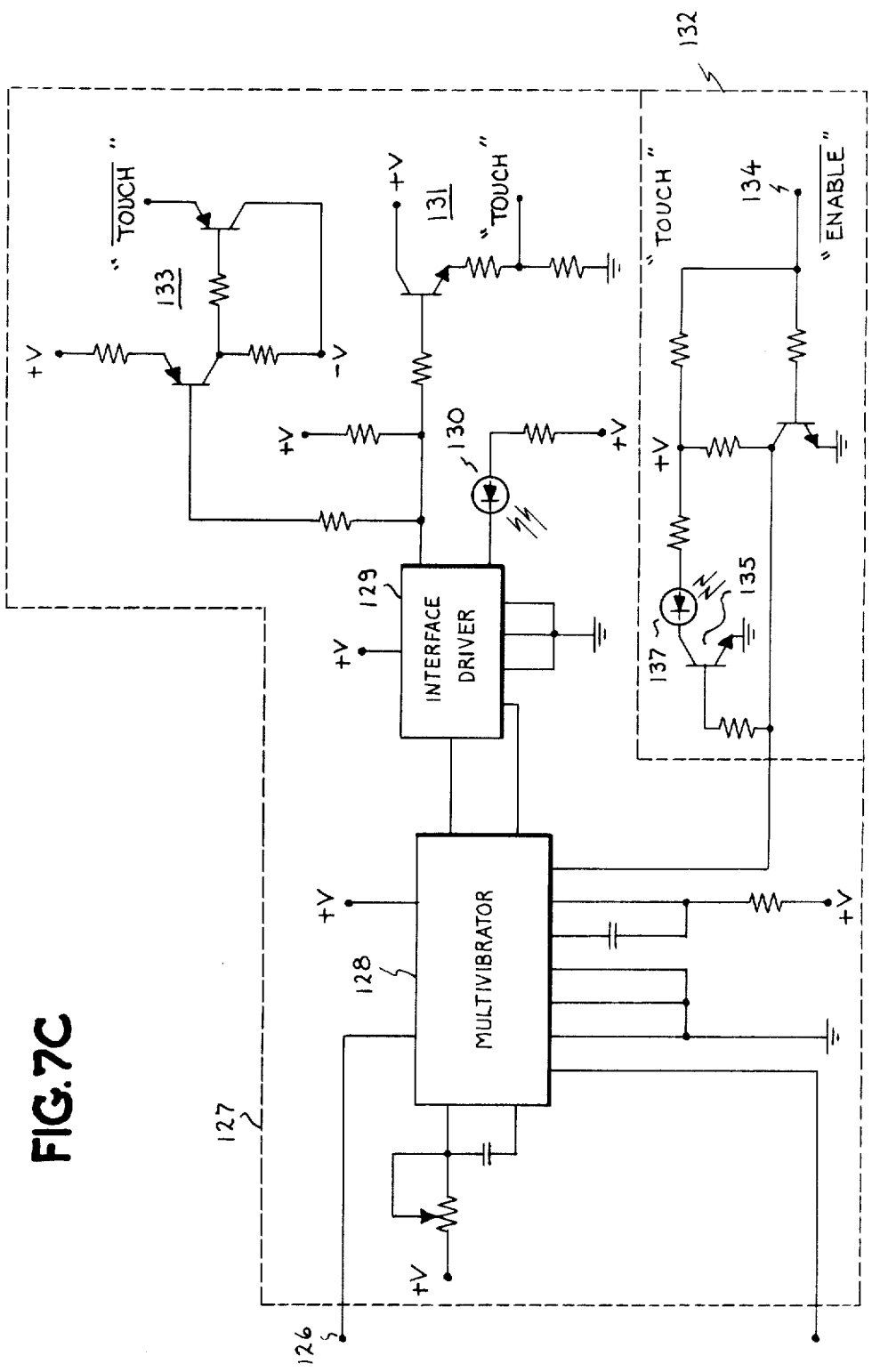

Once the cutting edge touches reference surface 44, vibrations are transmitted through tool 28, tool holder 30 and turret 26, to transducer 37. Upon detection of the vibrations, transducer 37 generates a responsive signal which is filtered, amplified and discriminated as described in connection with the circuit shown in FIGS. 6 and 7. If the signals meet the prescribed criteria and an enable signal is present, a tool touch signal is generated. The latter signal, as discussed in connection with FIG. 7C, provides a tool touch indication, e.g. through a light emitting diode or through a buzzer, and it also signals the numerical control means 46. The signal so applied to unit 46 causes the latter to store the feedback position data provided by the resolvers which are associated with the positioning motors. In the example under consideration, the specific resolver, or Inductosyn scale, associated with the Z axis positioning means provides this data to unit 46. From this information, unit 46 determines and stores the Z axis position of the cutting edge when tool touch occurs.

The position of the cutting edge is compared in unit 46 with the corresponding programmed data for each axis. In the present example, the compared Z axis quantities are the programmed contact position of cutting edge 32 relative to the origin and the actual contact position in the same axis relative to the origin which was stored in response to the occurrence of tool touch. The deviation between the compared quantities is computed and stored in the microprocessor which is incorporated in numerical control means 46 in an exemplary embodiment of the invention. This deviation is subsequently used in the computation of a compensating tool offset in the Z axis.

The operation described above is repeated for datum surface 42, either using the same tool or with a separate diameter cutting tool specifically intended for cutting external cylindrical work piece surfaces. Since such a separate tool will occupy a different tool location on turret 26, the turret must be indexed before the calibration can take place. Thereafter, by energizing the positioning motors under numerical control, saddle 18 and cross-slide 24 are positioned using the rapid approach rate until the tool cutting edge is located in line with surface 42. Positioning in the X axis follows at the slow feed rate, until the cutting edge makes contact with surface 42. As before, the tool touch signal generated when contact occurs is recognized by numerical control means 46 which then determines the X axis position of the cutting edge from the position feedback information received from the appropriate resolver. The X axis position data so determined is stored and compared to the corresponding programmed information. The computed deviation, if any, is stored for subsequent use in computing a first compensating tool offset in the X axis.

The calibration of the cutting edge of the tool is now complete. Subsequent calibrations may be carried out whenever a new cutting tool is installed to replace the existing one in the same tool holding location; when another tool on the same turret is used; when the cutting tool is set up for a different work piece or for a different machining operation on the same work piece; and following a machining operation which is likely to produce wear of the tool cutting edge, or metal buildup on the tool cutting edge. In each such instance, the calibration is performed with respect to the designated position reference surfaces.

At this time, a first set of deviations (one for each axis), has been stored in the numerical control means, computed for the difference (if any) between the programmed and actual contact positions of the tool cutting edge with reference surfaces 44 and 42. The microcomputer now computes the applicable initial tool offset in each axis from these deviations. It will be understood that the offset so computed for a particular axis may need to be further corrected for a variety of reasons. For example, if spindle face 40 is not in the expected location for some reason, or if the work piece held in the chuck jaws does not abut face 40, all Z axis measurements made on the work piece will be incorrect unless the previously computed offset is further corrected by the appropriate amount. The ultimately computed initial tool offset (first compensating offset) for each axis is then stored in unit 46.

Following the completion of calibration by tool touch probing to establish the initial tool offsets, the tool is ready to begin cutting when brought into contact with the work piece. Vibrator 39, if previously in use for calibration purposes, is now deenergized and the rotation of work piece 41 is initiated if it was previously halted for probing. Turret 26 is appropriately indexed (rotated) at this time to position the tool for cutting the desired work piece surface. In the turret position shown in FIG. 1, the apparatus is set up for machining the face surfaces of the work piece normal to center line 14.

The cutting operation proceeds under the control of the tape-stored machining program, modified by the initial tool offset stored in unit 46 for each axis. The machining program determines the action of the positioning motors which, in turn, determine the position and feed rate of the cutting tool. Likewise, the relative motion between cutting edge 32 and work piece 56, which is produced by the rotation of the work piece in the example under consideration, is controlled by the machining program.

In accordance with the present invention, rough cutting of a given surface proceeds until a predetermined amount of material remains to be removed. The amount left is preferably chosen so that it can be cut, either with the same tool or with a separate finishing tool, with two relatively shallow cuts of substantially equal depth, e.g. 10 mils taken at the same feed rate. If these cuts are identical, tool deflection due to strain and/or deflection of the tool holder and of other parts of the machine should be approximately the same. Where a separate finishing tool is used for the last two cuts, or for the last cut alone, the cutting edge of the finishing tool must be calibrated in the manner explained above in connection with 28.

Following the semi-finishing cut, the tool cutting edge is preferably calibrated again with respect to reference surfaces 42 and 44, substantially as described above. The purpose of the calibration at this time is to compensate for any changes that may have occurred in the X and Z axes since the last calibration, e.g. due to tool wear, or due to dimensional variations caused by heating of portions of the machine tool as a result of the cutting operation. If changes are detected upon calibration, they are stored as deviations in the numerical control means, substantially as explained above.

Following this calibration step, probing of the semi-finished surface is carried out under the control of unit 46. The positioning motors are appropriately energized in accordance with the numerical control program to provide rapid feed and slow feed positioning respectively until the tool touches the semi-finished surface. If the latter is assumed to be one of the face surfaces of work piece 41 for purposes of this example, final positioning occurs in the Z axis. Here again, tool touch may occur with the work piece rotating forward or backward, or with the rotation halted and with vibrations induced by vibrator 39. In either case, the position of cutting edge 32 when tool touch occurs is determined as described above and it is compared to the corresponding stored, programmed position, i.e. the expected position, of the work piece surface. Any deviation between the compared quantities is computed and stored. A tool offset correction can now be computed in each axis from the last two stored deviations, i.e. from the deviation determined upon re-calibration of the cutting edge and the deviation determined upon probing the semi-finished surface. The computed tool offset corrections are stored in numerical control means 46.

The final tool offsets are computed from the aforesaid tool offset corrections and from the initial tool offsets determined prior to the start of machining. The final tool offsets modify the final cutting operation controlled by the tape-stored program, so that the proper amount of material is removed from the semi-finished surface to obtain a finished surface having the desired dimensions.

In the example given above, the surface being probed is a face surface of the work piece and probing is normally carried out only at one point on this surface. This may not be the case when the surface being probed is the cylindrical outer or inner work piece surface. In such a case, probing may take place at various points around the periphery of the semifinished surface to provide greater precision or to measure the concentricity of the semi-finished surface. Further, X axis probing of such a surface at several points along the Z axis will establish the degree of parallelism with center line 14. Such X axis probing at multiple points along the Z axis is required where a tapered surface is being produced and measured.

It should be noted that the measurement of the work piece surface in effect serves to re-calibrate the cutting edge of the tool. For example, let it be assumed that the machining operation had programmed the tool to take a 10 mil semi-finishing cut in the Z axis on the face surface of the work piece. If the probe measurement of the semi-finished surface indicates that only 9 mils of metal was removed, a 1 mil offset is algebraically added to the existing offset and stored in the numerical control unit as a Z axis adjustment of the cutting edge for purposes of the final cut.

After the semi-finished surface has been probed by the tool touch technique described and the appropriate adjustments for the final offsets have been entered into numerical control means 46, the finishing tool is generally in operating position for taking the finishing cut. As previously explained, in order to maintain tool deflection constant during the finishing and semi-finishing cuts, these two cuts are preferably substantially identical in depth. However, the depth of the finishing cut may be modified by the amount of the final tool offset entered into the numerical control means following the probing of the semi-finished surface. In the example above, where both cuts were intended to be 10 mils deep but only 9 mils of metal were removed by the semi-finishing cut, the finishing cut must remove the remaining 11 mils. Under normal conditions, the difference in the depth of the cut will be so small that there will be only a negligible difference in the deflection of the tool.

The method disclosed herein is not limited to the use of two cutting tools. Situations may exist in which the same tool is used throughout and hence the calibration procedure for a separate finishing tool is obviated. However, when a particular tool is used, it is usually desirable to re-calibrate it before the final cut is taken. Situations also arise in which more than two tools are required for a particular machining operation. It will be understood that each tool used must be separately calibrated.

Upon completion of all cutting operations, a final tool touch probing operation is carried out to measure the actual dimensions of the finished work piece surface. The tool cutting edge is again calibrated against the reference surfaces in the manner described above. Subsequently, the positioning motors are appropriately energized to bring the cutting edge into contact with the finished work piece surface. From the position feedback data provided to the numerical control means when tool touch occurs, the actual position of the cutting edge is determined and compared to its programmed position. The deviation, if any, is computed and is stored in the numerical control means. The actual final dimension, e.g. the Z axis location of the machined face surface of work piece 41, is computed from the programmed final dimension and from the Z axis deviations stored as a result of tool touch probing the finished surface and the deviations stored pursuant to the immediately preceding calibration of the cutting edge.

The system under consideration preferably includes a display device and/or a printer by means of which all final dimensions, as well as the allowable tolerance for each dimension, may be indicated to the observer. The allowable tolerances must be previously stored in the program. From a comparison of the desired (programmed) final dimension and the actual final dimension, the deviation from the desired value may be computed and displayed together with the corresponding allowable tolerance. In the example under consideration, any deviation of the Z axis location of the finished face surface from where it is programmed to be, may be displayed together with the allowable tolerance for this dimension.

The foregoing discussion is intended to provide an overview of the present invention, which is directed to a system and method for machining a work piece surface to precise, selectively determined dimensions by employing tool touch probing. Listed below are specific operations that may be carried out automatically with a closed loop CNC or DNC numerical control system in accordance with the present invention and which are illustrated in FIGS. 8 to 15. Although the invention is not so limited, the process of machining the work piece is explained with reference to a lathe of the type shown in FIG. 1 for an operation which uses a single cutting tool throughout. The sequence of operations is as follows:

(1) Calibration of the cutting edge of the tool by tool touch probing.
(2) Making initial tool offsets.
(3) Performing rough and semi-finish cutting of the work piece or other removal of material.
(4) Calibration of the cutting edge by tool touch probing.
(5) Probing the cut work piece surface with the calibrated cutting edge.
(6) Making final tool offsets.
(7) Performing finish cutting of the work piece or other removal of material.
(8) Calibration of the cutting edge by tool touch probing.
(9) Probing of the finished machined work piece surface with the calibrated cutting edge.
(10) Displaying and/or printing the dimensions of the finished work piece, their deviations and the allowable tolerance for each.

It will be understood that those portions of steps (1), (2), (4)–(6) and (8)–(10) above, which deal with the computation of deviations and offset adjustments, are carried out in the microcomputer which is preferably incorporated in unit 46. Those portions of these steps that deal with the positioning of the tool, as well as steps (3) and (7), are carried out under the control of the tape-stored program. The operation is such that the deviation (if any) between the position at which the tool is programmed to touch a surface and the actual tool touch position is displayed by the control unit.

In the discussion below, various terms are used which are defined as follows:

$NCP_{1X}$—Position programmed in NC tape (Position 1, in X axis, in this case).

$REC_Z$—Reversal error compensation (component in the Z axis in this case). Added to programmed position when feed is in one direction. Removed when feed is in opposite direction. Constant for each axis at all positions. Used with resolvers only, not with Inductosyns or equivalent types of scales.

$LSC_{1X}$—Lead screw error compensation (component in X axis at $NCP_1$). Magnitude and sign depend on position of the axis. Compensates for lead screw errors when resolvers are used. Compensates for scale errors when scales are used.

$LAG_{1X}$—Lag of the machine axis (component in X axis at $NCP_1$) behind the commanded position due to inertia and friction upon start of motion. Lag magnitude is directly proportional to magnitude of feed rate. Sign is always the same as sign of feed direction.

$CPOS_{1X}$—Commanded position called for by program in control unit, modified by reversal error compensation, lead screw compensation and tool offset. (For $NCP_{1X}$ in this case.)

$TO101_X$—Tool offset-first two digits indicate tool number (01 in this case). Second two digits indicate tool offset number (tool number 01 uses offset number 01 in this case; X indicates offset in X axis). Magnitude and sign are selected for each tool to locate tool correctly.

$APOS_{1X}$—Actual position. Corresponds to commanded position modified by machine lag. Related to $NCP_{1X}$.

DISPLAY/—Function accomplished by CLM software (display of data in this case).

$AT0101_X$—Adjustment to tool offset (tool #1, offset #1, in X axis). Sign may be positive or negative.

$TRIP_{1Z}$—Position at which tool touch with a surface is detected. (Position in the Z axis, related to $NCP_{1Z}$).

$MTRIP_{2X}$—Tool touch position, modified by reversal error and lead screw compensation to a calculated position corresponding to programmed position (related to $NCP_{2X}$).

$DEV_{2X}$—Deviation of modified tool touch position from programmed position (deviation of $MTRIP_{2X}$ from $NCP_{2X}$). For axis direction signs used here, the sign tends to be positive when probed surface is further than programmed from position of spindle center line or from work piece reference face.

$DIM_{2X}$—Deviation of part dimension from programmed dimension (from dimension related to $NCP_{2X}$ in this case). For axis direction signs used herein, the sign is positive when probed diameter is greater than programmed, or probed face is further than programmed work piece reference face.

$T0630_Z$—Tool offset (in Z axis). Obtained by calibration of turret-mounted tool at work piece surface and used to offset this tool when probing conic and contoured surfaces. Number designation indicates use of tool #6 and offset #30.

PLO$_Z$—Work piece location offset (in Z axis). Used to compensate for deviation of actual location of face which locates work piece axially, and the location of this face used in program. Applied as Z axis offset to all tools.

DDIA—Diameter of datum means. Determined by precise measurement in a gauge calibration laboratory.

PDIA—Diameter of work piece.

DDIS—Distance of datum face from face which locates work piece. Used in program.

PLEN—Work piece length, measured paralled to work piece axis between two faces thereof.

It is useful to begin the explanation of a specific method used in the present invention with a discussion of the steps involved in a cutting operation on the lathe. During such an operation, the tool position is controlled by normal computer numerical control functions as already explained and no closed loop machining functions are employed. As set forth herein, the terms "tool" and "cutting edge" are occasionally used interchangeably insofar as the discussion of position is concerned.

The position of the cutting tool is determined by the numerical control program, through a value placed in a command register as modified by reversal error and lead screw compensation, by tool offset and by machine lag. Modification for reversal error is needed when resolvers are used to correct for slack between each lead screw and the nut driven thereby which is attached either to saddle 18 or to cross-slide 24. Lead screw compensation is required when resolvers are used to correct for errors in the lead screw itself. When scales are used, lead screw compensation can be used to correct for scale errors. Lead screw errors may be different at different locations on each lead screw.

Modification of tool offsets is needed to correct for many errors other than reversal and lead screw errors which cause the position of the cutting edge of the tool to deviate from the position which is needed to produce the required dimensions of the work piece. Tool offset can correct for errors on tool and tool holder geometry and for some errors in machine geometry. It can also correct for tool, tool holder, machine, and work piece deflection caused by machining forces.

The object of all these modifications is to position the tool exactly where the numerical control program should put it, so that it will machine the work piece to the programmed dimensions. In actual operation, it takes time to overcome friction and inertia forces and to accelerate to a specified feed rate in a particular axis from a stationary position. Consequently, the actual position of the cutting edge is always behind the commanded position, as modified by backlash and lead screw compensation and by tool offset. This is called machine lag and it is always present in a particular axis in which there is motion, i.e. in which the tool (or the work piece) is being positioned. It is not present in an axis in which the tool (or the work piece) is stationary. Lag is proportional to the feed rate along that axis. It should be noted, however, that lag generally does not cause deviations of the final work piece dimensions from the corresponding programmed dimension. This is due to the fact that in the process of stopping its motion in an axis the machine counts out (removes) the lag in a lag register as it slows down and finally comes to a stop.

Figure 8:
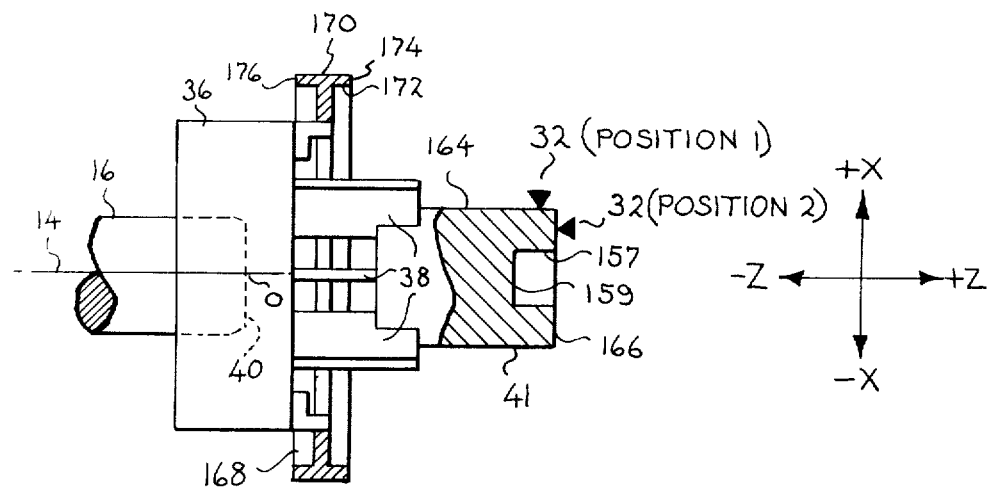
FIG. 8 is a simplified schematic illustration of a portion of the apparatus of FIG. 1, showing a cutting operation of the work piece.

The cutting operation of a simple work piece 41 is illustrated in schematic form in FIG. 8, applicable reference numerals having been brought forward. As shown, work piece 41 is held by chuck 36 and includes cylindrical internal and external surfaces 157 and 164 respectively, as well as internal and external face surfaces 159 and 166 respectively. Cutting edge 32 of the cutting tool, shown in two separate positions, removes metal (or other material) as it is fed into the work piece while the latter rotates relative to the cutting edge as determined by the rotation of the chuck.

In lieu of using the chuck surfaces as a position reference, FIG. 8 and subsequent Figures show the use of a separate datum ring 168, which is mounted on chuck 36 concentric with center line 14. Datum ring 168 includes outer and inner peripheral surfaces 170 and 172 respectively, as well as outer and inner face surfaces 174 and 176 respectively. The origin 0 of the program stored in the numerical control means is arbitrarily located at the intersection of center line 14 with the nose (face) of spindle 40.

The actual position (APOS$_1$) of cutting edge 32, when cutting peripheral surface 164 of work piece 41 (Position 1), is given for directions parallel to the X and Z axes by the following equations:

$$CPOS_{1X} = NCP_{1X} + TOTOL_{1X} + (REC_X + LSC_{1X}) + LAG_{1X}$$

$$APOS_{1X} = CPOS_{1X} \text{ (X axis is stationary.)}$$

$$CPOS_{1Z} = NCP_{1Z} + TOTOL_{1Z} + (REC_Z + LSC_{1Z}) + LAG_{1Z}$$

$$APOS_{1Z} = CPOS_{1Z} - LAG_{1Z} \text{ (Z axis is feeding.)}$$

The actual tool position (Position 2) for cutting face surface 166 is given by the following equations:

$$CPOS_{2X} = NCP_{2X} + TOTOL_{1X} + (REC_X + LSC_{2X}) + LAG_{2X}$$

$$APOS_{2X} = CPOS_{2X} - LAG_{2X} \text{ (X axis is feeding.)}$$

$$POS_{2Z} = NCP_{2Z} + TOTOL_{1Z} + (REC_Z + LSC_{2Z}) + LAG_{2Z}$$

$$APOS_{2Z} = CPOS_{2Z} \text{ (Z axis is stationary.)}$$

The foregoing equations establish the tool positions for rough cutting of surfaces 164 and 166 of the work piece under numerical control.

Figure 9:
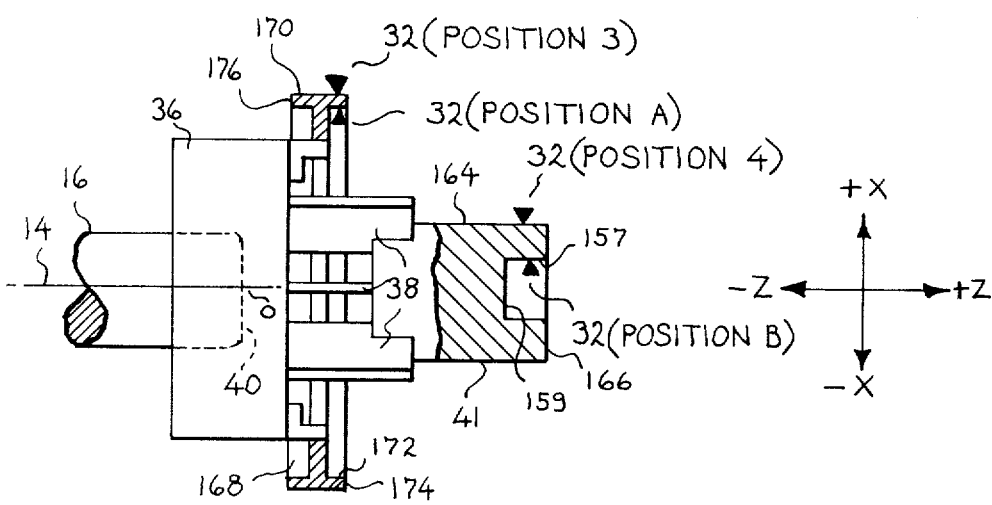
FIG. 9 illustrates the calibration of the tool cutting edge as well as tool touch probing of the work piece in the X axis, pursuant to making final tool offsets.

Before the final cut is taken, the work piece is probed with the cutting edge of the same tool after the latter is re-calibrated, or with the calibrated edge of a finishing tool if a separate tool is used for the final cut. This is illustrated in FIG. 9. As previously explained, re-calibration at this point of the operation serves to eliminate as error sources changes due to tool wear, heating, strain, etc. of the machine members which may have occurred since the initial calibration. The calibration is carried out by energizing the positioning motors under program control, substantially as described above. This action causes cutting edge 32 to be positioned in the Z axis using rapid feed, until it is located opposite datum surface 170. The latter position is the programmed position of the cutting edge modified by back lash and lead screw compensation. After that position is reached, there is no further motion in the Z axis and hence there is no lag. Accordingly, no modification for lag is required and no tool offset for the cutting edge is provided in this example. The Z axis position of cutting edge 32 is the same as shown by Position 3 in FIG. 9 and it is determined by ordinary NC operation. It is not affected by the software functions that ultimately determine positioning in the X axis. Thus, the Z axis position of the probe tip is as follows:

$$CPOS_{3Z} = NCP_{3Z} + REC_Z + LSC_{3Z}$$

$$APOX_{3Z} = CPOS_{3Z} \text{ (Z axis is stationary.)}$$

Positioning of cutting edge 32 in the X axis is likewise carried out under program control, by energization of the appropriate positioning motor to provide a fast feed rate at first and subsequently switching to a slow approach rate prior to actual contact. This action places the cutting edge into a position where it just touches datum surface 170 so that vibrations transmitted through the contacting members are sensed by transducer 37. A feed-hold signal is provided to control unit 46 which responds by zeroing the command register. The positioning motor is stopped or reversed a short distance. In an exemplary embodiment, that is accomplished by placing through software a value of zero, or an oppositely signed small reversal value, i.e., $-0.050$ inch, into the respective Z, or X axis, lag register immediately after applying a feed-hold command. The lag nulling or small reversal may also be produced by applying an appropriate voltage to the respective axis motor control circuit board. Those skilled in the art will recognize other available methods for accomplishing the reversal.

The position in the X axis ($TRIP_{3X}$) at which the tool touch signal is generated may be located before, at, or after the programmed position, as modified by back lash and lead screw compensation and by the lag of the positioning means. It is solely determined by the location of datum surface 170 and not by the programmed position of cutting edge 32. Thus, $$CPOS_{3X} = NCP_{3X} + (REC_{3X} + LSC_X)$$

$$APOS_{3X} = TRIP_{3X}$$

$$TRIP_{3X} <=> CPOS_{3X}$$

where $<=>$ indicates that the tool touch position may be less than ($<$), equal to ($=$), or greater than ($>$) the programmed position, modified by internal machine characteristics such as back lash and lead screw compensation.

If there is a difference between the programmed position and the actual position in the X axis where tool touch occurred, the deviation is determined by comparison and entered as a compensating offset. This is done by calculating a position in the X axis in the numerical control means, using software provided by the microprocessor functions. The calculated position is equivalent to the programmed position that would bring the cutting edge to the tool touch position.

This equivalent programmed position is calculated from the tool touch position and is called the modified tool touch (MTRIP) position. It is not necessary to include lag in this calculation, because the tool touch position is obtained at the moment when tool touch occurs.

The programmed software functions are put into operation by the NC program stored in the numerical control means. The calculation for the modified tool touch position in the X axis is as follows:

$$MTRIP_{3X} = TRIP_{3X} - (REC_X - LSC_{3X})$$

The difference between the modified tool touch position and the actual programmed position is then calculated by a microprocessor software function. A further software function stores this information for future use as an offset adjustment value. Where the system is adapted to do so, the information is also displayed or printed out. The calculation of the aforesaid deviation is as follows:

$$DEV_{3X} = MTRIP_{3X} - NCP_{3X}$$

$$DISPLAY, STORE/DEV_{3X}$$

In terms of actual dimensions, this deviation is the distance in the X axis between the actual (measured) position of datum surface 170, as determined by cutting edge 32, and the programmed position of the surface. Thus, the difference is determined along a radius of the datum ring relative to origin 0.

After cutting edge 32 has been position-calibrated, the machined surfaces of work piece 41 are probed. This is done at least once before the finishing cut is taken to determine the final tool offset that is to be entered into numerical control means 46. In accordance with the present invention, cutting edge 32 is positioned in the Z axis under control of the NC program in the numerical control means, to a location opposite peripheral surface 164. Similarly, the cutting edge is positioned in the X axis under NC program control until it just touches peripheral surface 164. The cutting edge position here is designated as Position 4 in FIG. 9. At this point in the process, surface 164 has been rough-cut to a semi-finished surface which has a programmed diameter 20 mil greater than the programmed diameter of the finished surface in an exemplary embodiment of the invention.

The cutting edge positions in the Z and X axes are given by the following equations:

$$APOS_{4Z} = NCP_{4Z} + (REC_Z + LSC_{4Z})$$

$$APOS_{4X} = TRIP_{4X}$$

$$TRIP_{4X} <=> NCP_{4X} + (REC_X + LSC_{4X})$$

$$MTRIP_{4X} = TRIP_{4X} - (REC_X + LSC_{4X})$$

$$DEV_{4X} = MTRIP_{4X} - NCP_X$$

$$DISPLAY, STORE/DEV_{4X}$$

The deviation defined by the last equation set forth above is the difference along the X axis direction between the actual (measured) position of cutting edge 32 on surface 164 and its programmed position. This difference is measured along the radius of work piece surface 164 and tends to be positive when the actual radius is greater than the programmed one and negative when it is smaller than programmed. The difference between the X axis deviation at the datum surface and the X axis deviation at the work piece is equal to the amount by which the actual work piece radius differs from the programmed work piece radius. After this difference is added to any X axis offset which may exist for cutting edge 32, the cutting edge should produce the programmed final diameter within its allowable tolerances when the finishing cut is taken on the work piece. This difference is therefore the adjustment needed for offsetting cutting edge 32.

The adjustment is calculated by CLM functions in the microcomputer which is preferably incorporated in unit 46 and it is put into operation by the NC program. A CLM function may display this adjustment on the display of unit 46 if the system is so equipped. A further CLM function adds this adjustment to the X axis offset for the cutting edge, which is stored in control unit 46.

The pertinent equations are given below:

$$AT0101_X = DEV_{3X} - DEV_{4X}$$

$$DISPLAY/AT0101_X$$

$$ADD\ TO\ EXISTING\ T0101_X/AT0101_X$$

As previously explained, more than one cutting tool may be used to cut external peripheral surface 164. For example, a rough cut tool may be used at first and the semi-finishing and finishing cuts may be made with a separate finishing tool. Alternatively, only the finishing cut may be made with a separate finishing tool. Also, it may be expedient to cut different surfaces of a work piece with different cutting tools. Different surfaces of a work piece, e.g. opposite blend radii of a groove, may also be machined with different portions of the cutting edge of the same tool.

In all such instances, each surface of the work piece which was cut by a different tool, or by different portions of the same cutting edge, may need to be separately probed in one or more axes. The purpose of such probing is to determine whatever adjustments are needed in each axis for the offsets of these additional tools. Unless different portions of the same cutting edge are used, the calibration of the cutting edge need not be repeated in most instances for each of these operations, for the reason that the deviation obtained at the datum surface for a particular tool is stored by the numerical control means until all peripheral surface probing of the work piece has been completed for that tool. However, the use of different portions of a single cutting edge dictates two separate calibration operations. In the exemplary embodiment of the invention under consideration here, the second calibration is carried out only after all machining operations with the first edge portion have been completed.

In any of the situations outlined above, adjusted tool offsets continue to be stored for use in further cutting operations.

Offsets for tools which machine inside cylindrical surfaces, such as surface 157, are made in substantially the same manner. Greater precision is obtainable if the same surface area of cutting edge 32 is used for the calibration and for the probing operation. Accordingly, cutting edge 32 is calibrated against an inner peripheral surface of the datum ring, i.e. surface 172, as shown in FIG. 9 at Position A. Inner cylindrical surface 157 of the work piece is then probed with the same surface area of the cutting edge, as shown at Position B in FIG. 9.

Figure 10:
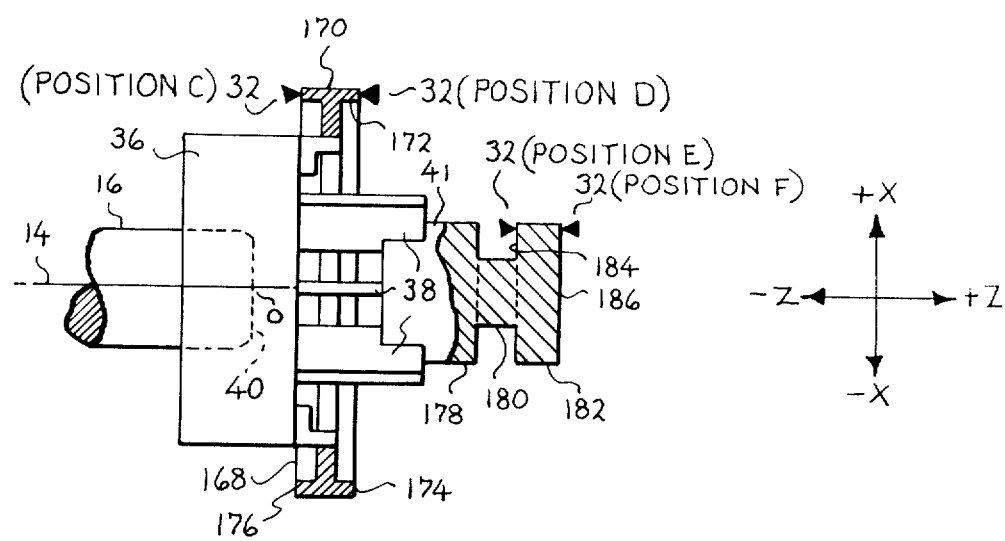
FIG. 10 illustrates calibration and tool touch probing pursuant to making final tool offsets in the Z axis, using a work piece of a different configuration.

FIG. 10 shows a work piece 41 of a somewhat different configuration which illustrates the adjustment of offsets in the Z axis of tools used to machine face surfaces of the work piece. The component portions of this work piece are seen to comprise a pair of rings 178 and 182 which have the same diameter, separated by a ring 180 of smaller diameter. The configuration defines a plurality of face surfaces, e.g. surfaces 184 and 186, each of which lies in a plane that is normal to spindle center line 14. Cutting edge 32 is calibrated by contact with datum surface 176 (Position C), which constitutes an inside face surface of datum ring 168. Subsequently the inside face surface 184 of machined work piece 41 is probed, as shown at Position E. Outside face surface 174 of datum ring 168 is used to calibrate the cutting edge of another tool which is typically used to machine such surfaces. This is illustrated in Position D. This last calibrated cutting edge is then used to measure outside face surface 186 of work piece 41 (Position F).

For purposes of determining tool offset adjustments in the Z axis, the cutting edge is positioned in the X axis under NC program control until it is located opposite the desired face surface of the datum ring or of the work piece respectively. The cutting edge is likewise positioned under program control in the Z axis. The actual Z axis position is determined when cutting edge 32 touches the desired face surface and the vibrations sensed by the transducer produce a tool touch signal which causes the corresponding feedback signal to be entered into numerical control means 46.

Offsets may also be adjusted to control the length between two face surfaces. In such a case, one face surface is selected as the reference surface and is used in place of the corresponding datum face surface. The other face surface is then cut by the tool whose offset is to be adjusted. If required, offsets may be adjusted after any cut. However, to do so will increase the total time required to machine a work piece, since it does not eliminate the requirement for making the final offset immediately before the finishing cut is made.

In accordance with the present invention, after the finishing cut has been made the actual (final) dimensions of the finished surface are measured to determine the deviation from the selectively determined (programmed) dimensions. To do so, it is first necessary to calibrate the position of the cutting edge. This calibration is carried out substantially in the same way as was done to determine the final tool offsets.

Figure 11:
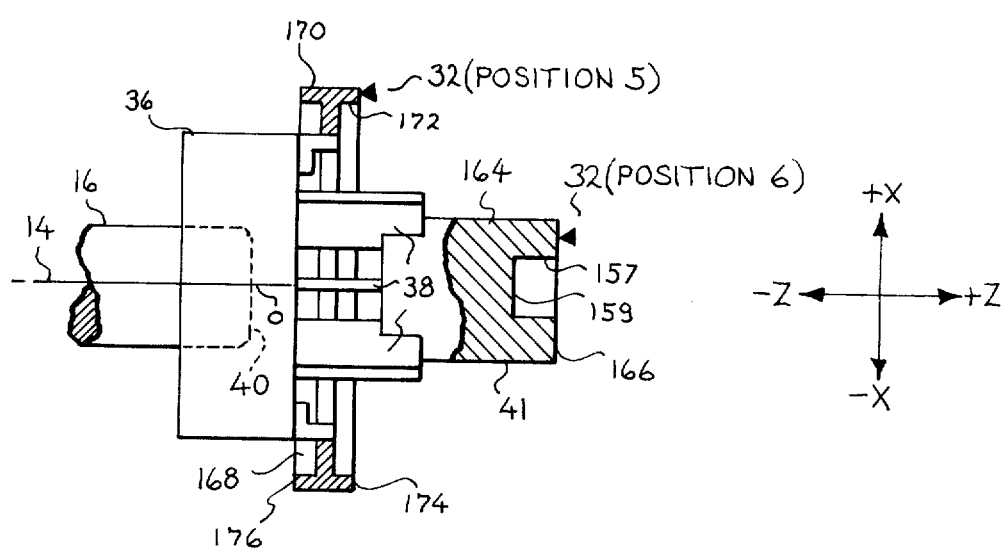
FIG. 11 illustrates calibration and tool touch probing in the Z axis of a finished work piece surface.

The example illustrated in FIG. 11 is limited to the calibration of cutting edge 32 in the Z axis prior to measuring the deviation between an actual face surface dimension of the work piece and the corresponding desired (programmed) dimension. As shown, in Position 5 cutting edge 32 is in contact with datum surface 174, which forms the outer face surface of datum ring 168. The pertinent positions for this operation in the X and Z axes and the calculated deviation in the Z axis are defined by the following equations:

$$APOS_{5X} = NCP_{5X} + (REC_X + LSC_{5X})$$

$$APOS_{5Z} = TRIP_{5Z}$$

$$MTRIP_{5Z} = TRIP_{5Z} - (REC_Z = LCS_{5Z})$$

$$DEV_{5Z} = MTRIP_{5Z} - NCP_{5Z}$$

$$DISPLAY,\ STORE/DEV_{5Z}$$

It will be understood that calibration of the cutting edge is also required in the X axis. This calibration likewise follows the operation used for making final tool offsets in the X axis and therefore requires no further discussion.

Following the calibration of the tool cutting edge, the finished work piece surface is probed. The example below is limited to the probing of work piece face surface 166. Position 6 of cutting edge 32, shown in FIG. 11, is defined by the equations set forth below, together with the calculated deviation in the Z axis.

$$APOS_{6X} = NCP_{6X} + (REC_X + LSC_{6X})$$

$$APOS_{6Z} = TRIP_{6Z}$$

$$MTRIP_{6Z} = TRIP_{6Z} - (REC_Z + LSC_{6Z})$$

$$DEV_{6Z} = MTRIP_{6Z} - NCP_{6Z}$$

DISPLAY, STORE/$DEV_{6Z}$

The determination of the deviation of the measured final dimensions of the finished surface from the desired (programmed) dimensions is carried out in a manner similar to, although not identical with, the determination of adjustments of tool offsets. Specifically, the deviation determined upon calibration of the position of cutting edge 32 is subtracted from the deviation determined by probing the work piece. An example is given below for determining the deviation of a face surface dimension:

$$DIM_{6Z} = DEV_{6Z} - DEV_{5Z}$$

DISPLAY/$DIM_{6Z}$

Deviations in the X axis, e.g. of the diameter of a cylindrical surface, may be determined in substantially the same way.

Figure 12:
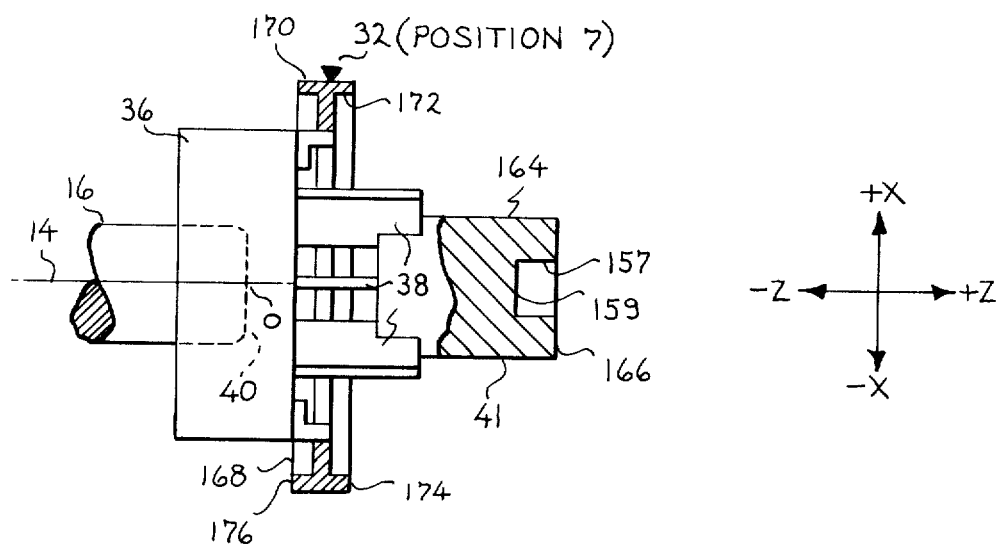
FIG. 12 illustrates the calibration of the tool cutting edge in the X axis pursuant to making initial tool offsets.

As previously discussed, before any cutting operation can be started initial tool offset adjustments may need to be made pursuant to the calibration of the tool cutting edge. In general this operation is carried out as previously described. FIG. 12 illustrates an example of a calibration operation limited to the X axis. Since this operation is substantially the same as that described above, the pertinent equations are likewise similar except for the position subscripts, which here refer to position 7. Accordingly, no further discussion is deemed to be necessary.

After all of the foregoing calibration operations have been completed, the initial tool offset can be determined and entered into the numerical control means. This offset is computed from the deviation obtained when calibrating the position of cutting edge 32 as follows:

$$T0101_X = DEV_{7X}$$

DISPLAY, STORE/$T0101_X$

Tool offset in the Z axis may be determined in a way which is similar to that for the X axis.

It will be clear from the foregoing discussion that whenever an initial offset is determined in either axis for a tool, any previously determined offset which is then stored for that tool in that axis must be discarded in order to prevent erroneous initial offsets. While this operation may be done manually by the machine operator, in the present invention this function is performed automatically by the program which resides in numerical control unit 46.

The foregoing discussion was confined to surfaces which are parallel to either the X or the Z axis. It will be clear, however, that the invention is not so limited. By suitably controlling the energization of the positioning motors, the calibration, probing and cutting of conical and other surfaces is readily achievable. For the sake of brevity, the discussion of machining such surfaces has been omitted here.

It will be clear from the foregoing discussion that the invention disclosed herein also lends itself to the measurement of work piece dimensions and that such measurements may be made at any time. In general, the measurement of the dimensions of the work piece on a lathe is made by using the X axis as a scale or micrometer, and using the datum ring as a standard or gauge ring. Axis positions, which are defined as modified tool touch positions, are used like positions on a scale. Deviations between modified tool touch positions and programmed positions which are used when adjusting tool offsets, are not used for the measurement of dimensions.

Figure 13:
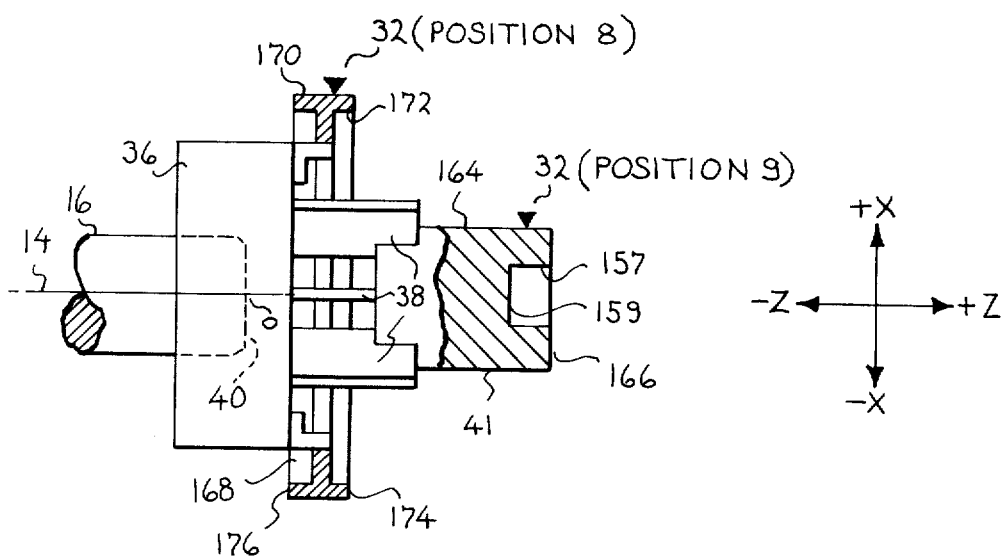
FIG. 13 illustrates calibration and a tool touch diameter measurement on a machined cylindrical work piece.

FIG. 13 illustrates a diameter measurement of a machined peripheral surface. The pertinent equations are as follows, reference being had to Positions 8 and 9 in FIG. 13:

$$MTRIP_{8X} = TRIP_{8X} - (REC_X - LSC_{8X})$$

$$MTRIP_{9X} = TRIP_{9X} - (REC_X - LSC_{9X})$$

$$PDIA_9 = DDIA - 2(MTRIP_{8X} - MTRIP_{9X})$$

DISPLAY, PRINT/$PDIA_{12}$

The differences between the radius of datum ring 168 (the datum ring diameter being included in the stored NC program) and the radius of work piece 41 is obtained by probing external cylindrical datum surface 170 (Position 8) and external cylindrical work piece surface 164 (Position 9). An X axis position is determined for each radius and the distance along the X axis between the two positions is obtained by subtracting the position for the radius of the work piece from the position for the radius of the datum ring. This radius difference is doubled to obtain the diametral difference whose sign, negative or positive, indicates whether the work piece has a smaller or larger diameter, respectively, than the datum ring. The subtraction of the diameter differences from the diameter of the datum ring then yields the diameter of the work piece.

Axial locations on the work piece, i.e. locations along the Z axis or parallel thereto, are occasionally determined by the position of the faces of the chuck jaws instead of the faces of a datum ring. These faces are designated by the reference numerals 173 and 175 in FIG. 14, which illustrates the measurement of a location offset pursuant to the determination of an axial location (along the Z axis) on the work piece. Since the jaw faces are machined periodically, a work piece axial location will generally differ from the corresponding location used in the program. Consequently, it is necessary to compare the actual chuck face location with the programmed face location and to compensate for any deviation by offsetting all tools in the Z axis. This is done before the work piece is placed into the chuck.

Figure 14:
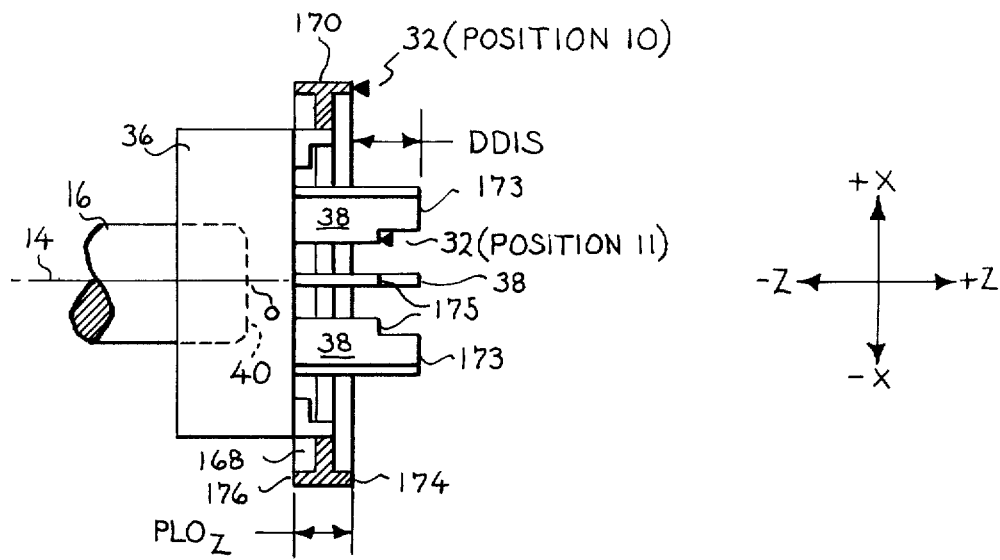
FIG. 14 illustrates the measurement of a location offset pursuant to the determination of an axial location on a work piece.

As will be clear from a consideration of FIG. 14, the axial offset $PLO_Z$ is the distance in a direction parallel to the Z axis of chuck face 175, which locates the work piece in the Z axis direction, from the programmed position of that face represented by reference numeral 173. The latter is shown to be located a distance DDIS from the programmed position of datum face 174, again measured in a direction parallel to the Z axis. The position of cutting edge 32 upon contact with face 174 of datum ring 168 is designated as position 10 in the drawing. The position of cutting edge 32 upon contact with chuck face 175 is designated as position 11. The location offset on the work piece can then be determined as follows:

$$DEV_{10Z} = MTRIP_{10Z} - NCP_{10Z}$$

$$DEV_{11Z} = MTRIP_{11Z} - NCP_{11Z}$$

$$PLO_Z = DEV_{11Z} - DEV_{10Z}$$

DISPLAY, STORE/$PLO_Z$

Location offset $PLO_Z$ is applied as a Z axis offset to all tools to enable them to produce programmed work piece dimensions. To accomplish this, the location offset of the work piece is stored in numerical control unit 46 and the program provides instructions for automatically adding this offset to whatever other offset in the Z axis is stored for that tool.

Whenever a location offset for a particular work piece is determined, any previously obtained offset must be discarded and replaced by the new offset so that the stored location offset for that work piece will be correct and provide the appropriate offset for addition to future initial tool offsets.

The location offset for the work piece also applies as an offset to cutting edge 32 when the latter is used to probe a face of the work piece, but not when it is used to probe a datum face. This is done when adjusting tool offsets and while determining work piece dimensions and dimensional deviations. The offset for the cutting edge is discarded immediately after each use to prevent erroneous offsets. Instructions in the stored program are used for automatically applying and discarding the location offset for the cutting edge. It should be noted that a location offset for the work piece may not be used to correct for a deviation of the datum face location from the face location used in the program since that could easily result in errors.

Figure 15:
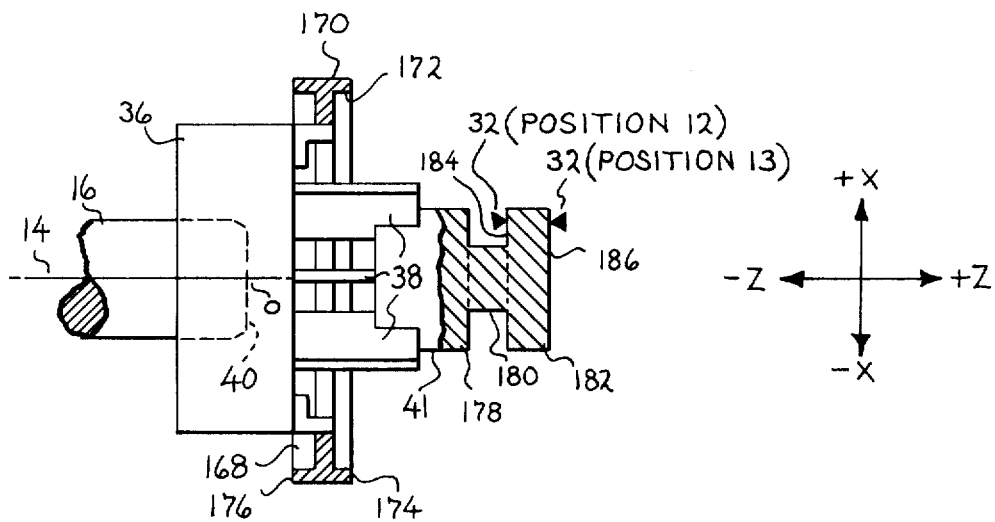
FIG. 15 illustrates a length measurement, using a work piece configuration similar to that shown in FIG. 10.

The present invention also lends itself to the measurement of length dimensions, e.g. along the Z axis from one face surface of the work piece to another face surface. This is illustrated in FIG. 15 wherein work piece 41 has a configuration identical to that shown in FIG. 10, i.e. consisting of three separate rings 178, 180 and 182. Here the location offset of the work piece is used as an offset for cutting edge 32 each time the work piece is probed. The use of this offset assures that tool touch will occur in situations where the work piece locating face surface, e.g. surface 184, is located at a relatively great distance from the programmed location of such face surface. The drop measurement operation is defined by the equations below:

$$MTRIP_{12Z} = TRIP_{12Z} - (REC_Z + LSC_{12Z}) + PLO_Z$$

$$MTRIP_{13Z} = TRIP_{13Z} - (REC_Z + LSC_{13Z}) + PLO_Z$$

$$PLEN_{13} = MTRIP_{13Z} - MTRIP_{12Z}$$

DISPLAY, PRINT/$PLEN_{13}$

The foregoing description, when considered in conjunction with the accompanying drawings, is deemed to be sufficient to convey a full understanding to those skilled in the art of the system and the method which constitute the subject matter of the present invention. In addition, an exemplary computer program is submitted herewith as Appendix A of this specification, which sets forth in detail the steps for carrying out the method disclosed herein.

It will be clear from the foregoing discussion that the tool touch system and method of precision machining disclosed herein, wherein tool offsets are made automatically, is superior to conventional numerically controlled machining systems wherein an operator controls the dimensions of the work piece by manually making tool offsets to compensate for errors of all kinds. Among other advantages, the invention makes possible significantly higher production rates by increasing the capacity of each machine tool. The foregoing advantage also applies with respect to closed loop machining systems which are automated under computer numerical control control. The manner in which the present invention determines tool offsets not only provides a machine tool of higher manufacturing capacity, but also one which is capable of machining a work piece with greater precision.

Notwithstanding the advantages over known prior art systems, the present system is subject to errors from a number of sources which must be recognized and dealt with. Dimensional deviations may arise from such factors as program errors, machine errors, strain of the work piece, datum errors, unusual tool wear, etc. By properly identifying the error source in each instance, measures can be taken to prevent such errors from showing up in the final dimensions of the finished surface.

Generally speaking, differences in the actual location of a particular datum surface and its location in the stored program will not produce dimensional deviations of the work piece if the same differences apply to work piece locations. Consequently, in the case of a lathe, for example, temperature changes to which the lathe head stock and the lathe spindle are subjected and which produce equal positional changes of the datum surfaces and of the work piece locations, will not cause dimensional deviations when the work piece is machined. This is important to recognize because the datum surfaces and the work piece may suffer a change of location by as much as 1 mil or more in the X or Z axes as the head stock and the spindle heat up during operation of the machine.

However, any differences between an actual location of a datum surface and the corresponding position stored in the NC program must be duplicated by work piece location differences. If not, they are capable of causing equivalent deviations of the dimensions of the work piece. For example, if face surface 174 of datum rings 168 in FIG. 11 is actually located 10 mils further from the origin than its programmed position indicates, face surface 166 of work piece 41 will likewise be 10 mils further to the right. Any differences between the actual dimensions of the datum ring and the dimensions stored in the NC program, unless compensated for, will cause deviations in the dimensions of the work piece of the same magnitude. Thus, if the diameter of datum ring 168 is 10 mils greater than its programmed diameter, the diameter of work piece 41 will also be 10 mils greater. In general, any machine errors that are not compensated with programmed compensation functions, or with adjustments to the machining program, or with tool offsets, can cause equivalent deviations of the dimensions of the work piece.

When resolvers are used to obtain position feedback information, the reversal error may be on the order of 1 mil or more. Unless a reversal of direction can be avoided, this error must be compensated. Another potential dimensional variation arises from probing the datum ring in a direction different from that used for probing the work piece with the same cutting edge. As already mentioned, the change of direction exposes different areas of the cutting edge to contact. Thus, as a general rule, the probing directions and cutting edge touch locations should be the same wherever possible and compensation may have to be provided when they are not.

Any difference between the actual location of the cutting edge of the tool and its programmed location is automatically corrected each time a tool offset is determined with CLM functions. To assure that the offsets which have been made do in fact correct for tool wear, all surfaces of the work piece dimension will reflect the wear condition just prior to making the offset adjustment. If this is not done, any tool wear which occurs after the offsets are made will generally produce equivalent deviations of the work piece dimensions.

Dimensional deviations may also occur as a result of mechanical strain during a cutting operation, which may be expressed in the form of a deflection of the tool, the tool holder, certain components of the lathe and deflection of the work piece itself. Since strain is caused by cutting forces, it does not occur during tool touch probing. Therefore, the effects of strain on work piece dimensions must be recognized when the work piece is probed, so that the tool offset adjustments that are made will also compensate for this source of error. In general, since the final tool offset is determined from the semi-finished surface, strain errors will be avoided if the strain can be equalized during the last two cuts, i.e. the semi-finishing cut and the finishing cut. Accordingly, these cuts are preferably made at substantially the same depth, at the same speed of rotation of the work piece and at the same feed rates.

It will be apparent from the preceding discussion that the various error sources to which the system and method disclosed herein are subject can be compensated for more readily with the present invention than is the case in prior art CNC or DNC machining systems and that such compensation may be implemented in a manner which makes intervention by the operator unnecessary. Accordingly, the manufacturing capacity of the machine is not diminished and the precision with which work pieces may be machined to desired dimensions remains high.

The system and method which constitute the subject matter of the present invention are not limited to the specific machine tools discussed herein. The principles of the invention are equally applicable to variations of the machine tools disclosed, e.g. to a lathe with a vertically positioned spindle, or a lathe whose axes of motion are not mutually perpendicular. Similarly, the invention disclosed and claimed is applicable to other types of machine tools such as, for example, a milling machine. In contrast to a lathe, there may be three or more axes of machine motion in a milling machine. Further, relative motion between the cutting tool and the work piece is carried out by rotation of the cutting tool rather than by rotation of the work piece. The cutting tool normally remains in place in a milling machine, while the work piece holding means may be movable in two or more axes and is so positioned for cutting. It will be clear that in such an arrangement, e.g. in a three-axis machining setup, probing as well as position feedback occurs in the three axes of machine motion.

From the foregoing description it will be clear that the invention lends itself to numerous variations, modifications, substitutions and equivalents, all of which will now be apparent to those skilled in the art. Accordingly, it is intended that the invention be limited only be the scope of the appended claims.

We claim:

1. A method for precision machining at least one surface of a work piece by means of a programmable, numerically controlled machining system, said system including numerical control means adapted to operate under the direction of a selected machining program, at least one cutting tool and at least first and second reference surfaces adapted to provide a position reference with respect to the origin position of the selected program;

said method comprising:
(1) probing said reference surfaces with a cutting edge of said tool during rapid relative motion therebetween to calibrate the position of said cutting edge in at least first and second axes of motion each normal to one of said reference surfaces;
(2) sensing vibrations transmitted upon the occurrence of probing contact between said cutting edge and the probed reference surface;
(3) signaling the actual contact position of said cutting edge to said numerical control means in each of said axes in response to said sensed vibrations;
(4) storing first deviations in said numerical control means each determined by the difference along one of said axes between the programmed contact position of said cutting edge with the corresponding reference surface and said actual contact position;
(5) storing first compensating offsets in said numerical control means each determined at least in part by one of said first deviations in each axis;
(6) machining said work piece with said tool during rapid relative motion between said cutting edge and said work piece, said machining step being performed under control of said program modified by said first offsets;
(7) probing the machined work piece surface with said cutting edge during rapid relative motion therebetween to provide a measurement at least in one of said axes;
(8) sensing vibrations transmitted upon the occurrence of probing contact between said cutting edge and said machined surface; and
(9) signaling the actual contact position of said cutting edge in at least said one axis to said numerical control means in response to said last-recited sensed vibrations.

2. A method in accordance with claim 1 adapted to provide a finished surface having selectively determined final dimensions which are included in said program;

said method further comprising the steps of:

(10) storing second deviations in said numerical control means each determined by the difference along one of said axes between the programmed contact position of said cutting edge with said machined surface and its actual contact position;

(11) storing offset corrections in said numerical control means determined in each axis at least in part by a corresponding one of said second deviations;

(12) storing final compensating offsets in said numerical control means determined in each axis by corresponding ones of each of said first offsets and said offset corrections respectively; and

(13) machining said work piece during rapid relative motion between said workpiece and said cutting edge, the last-recited machining step being performed under control of said program modified by said final offsets to provide said finished surface.

3. A method in accordance with claim 2 wherein said program further includes the allowable machining tolerances for each selectively determined dimension;

said method further comprising the steps of:

(14) probing said finished surface with said cutting edge during rapid relative motion therebetween to provide a measurement in at least said one axis;

(15) sensing vibrations transmitted upon the occurrence of probing contact between said cutting edge and said finished surface;

(16) signaling the actual contact position of said cutting edge in at least said one axis to said numerical control means in response to said last-recited sensed vibrations;

(17) storing third deviations in said numerical control means each determined by the difference along one of said axes between the programmed contact position of said cutting edge with said finished surface and its actual contact position;

(18) providing an indication in each axis of the actual final dimension of said finished surface determined at least in part from the corresponding third deviation and the corresponding selectively determined final dimension; and

(19) providing an indication in each axis of the deviation of the actual final dimension from the corresponding selectively determined dimension together with the allowable machining tolerance corresponding to the latter dimension.

4. A method in accordance with claim 3 wherein steps (1) to (4) are further performed in succession immediately preceding each of steps (7) and (14) to store fourth and fifth deviations respectively in said numerical control means:

wherein the magnitude of said offset corrections is additionally determined by said stored fourth deviations; and wherein the magnitude of said actual final dimensions is further determined by said stored fifth deviations.

5. A method in accordance with claim 4 wherein said first offsets stored in step (5) are computed at least from said first deviations;

said offset corrections stored in step (11) are computed from said stored second and fourth deviations;

said final offsets stored in step (12) are computed from said stored first offsets and said stored offset corrections;

said actual final dimensions indicated in step (18) are computed from said stored third and fifth deviations and said selectively determined dimensions; and said deviations from said selectively determined dimensions indicated in step (19) are computed from the latter dimensions and said actual final dimensions.

6. A method in accordance with claims 1 or 4 wherein said work piece is supported by rotatably mounted work piece holding means and said reference surfaces are adapted to rotate jointly with said work piece holding means, said tool being supported by tool holding means adapted to move in said at least first and second axes;

wherein said rapid relative motion is provided by the rotation of said work piece and said reference surfaces with respect to the cutting edge of said tool.

7. A method in accordance with claims 1 or 4 wherein said work piece is supported by rotatably mounted work piece holding means and said reference surfaces are adapted to rotate jointly with said work piece holding means, said tool being supported by tool holding means adapted to move in said at least first and second axes;

wherein said rapid relative motion for said machining is provided by the rotation of said work piece and said reference surfaces with respect to the cutting edge of said tool; and said rapid relative motion for said probing is provided by vibrating said work piece and said reference surfaces with respect to said cutting edge while said rotation is halted.

8. A method in accordance with claim 6 wherein each of said sensing operations detects vibrations transmitted to said tool when said cutting edge makes actual probing contact with said work piece or with one of said reference surfaces; and wherein each of said signaling operations includes the steps of:

deriving a signal in response to said sensed vibrations; and discriminating against spurious signals originating from sources other than actual probing contact;

whereby a true contact signal is derived only when an actual probing contact occurs.

9. A method in accordance with claim 7 wherein each of said sensing operations detects vibrations transmitted to said tool when said cutting edge makes actual probing contact with said work piece or with one of said reference surfaces; and wherein each of said signaling operations includes the steps of:

deriving a signal in response to said sensed vibrations; and discriminating against spurious signals originating from sources other than actual probing contact;

whereby a true contact signal is derived only when an actual probing contact occurs.

10. A method in accordance with claim 6 wherein said first and second axes are mutually perpendicular.

11. A method in accordance with claim 7 wherein first and second axes are mutually perpendicular.

12. A method in accordance with claims 1 or 4 wherein said work piece is supported by work piece holding means capable of translational movement in said at least first and second axes, said tool being rotatably supported by tool holding means and being further arranged for movement in at least a third axis of motion angularly disposed with respect to the plane defined by said first and second axes, a third reference surface normal to said third axis; and wherein said calibration and probing operations are further carried out in said third axis; and said rapid relative motion is provided by said rotating tool.

13. A method in accordance with claims 1 or 4 wherein said work piece is supported by work piece holding means capable of translational motion in said at least first and second axes, said tool being rotatably supported by tool holding means and being further arranged for movement in at least a third axis angularly disposed with respect to the plane defined by said first and second axes, a third reference surface normal to said third axis;

wherein said calibration and probing operations are further carried out in said third axis;

said rapid relative motion for said machining being provided by rotating said tool; and said rapid relative motion for said probing being provided by vibrating said tool with respect to said work piece while said translational motion of said work piece holding means is halted.

14. A method in accordance with claim 13 wherein the rotation of said tool is halted during each of said probing operations.

15. A method in accordance with claim 12 wherein said rapid relative motion for said machining is provided by rotating said tool in a forward direction; and said rapid relative motion for said probing is provided by rotating said tool in a backward direction while said translational motion of said work piece holding means is halted.

16. A method in accordance with claim 12 wherein said first, second and third axes are mutually perpendicular and wherein said tool is adapted to rotate around an axis parallel to said plane.

17. A method in accordance with claim 13 wherein said first, second and third axes are mutually perpendicular and wherein the axis of rotation of said tool is positioned parallel to said plane.

18. A method in accordance with claim 12 wherein each of said sensing operations detects vibrations transmitted to said work piece holding means when said cutting edge makes actual probing contact with said work piece or with one of said reference surfaces; and wherein each of said signaling operations includes the steps of:

deriving a signal in response to said sensed vibrations; and discriminating against spurious signals originating from sources other than actual probing contact;

whereby a true contact signal is derived only when an actual probing contact occurs.

19. A method in accordance with claim 14 wherein each of said sensing operations detects vibrations transmitted to said work piece holding means when said cutting edge makes actual probing contact with said work piece or with one of said reference surfaces; and wherein each of said signaling operations includes the steps of:

deriving a signal in response to said sensed vibrations; and discriminating against spurious signals originating from sources other than actual probing contact;

whereby a true contact signal is derived only when an actual probing contact occurs.

20. A method in accordance with claims 1 or 4 wherein said machining and said probing operations of the work piece are performed concurrently.

21. A numerically controlled system for precision machining at least one surface of a work piece to selectively determined final dimensions;

said system comprising:

programmable numerical control means;

machining apparatus including a stationary bed, work piece holding means, and tool holding means adapted to mount one or more tools and to place one of said tools into operating position;

means for providing rapid relative motion between the cutting edge of said tool and said work piece, said tool being adapted when stationed in its operating position to effect the removal of material from said work piece during said rapid relative motion while said cutting edge is forced against said work piece;

means controlled by said numerical control means for positioning said respective holding means relative to each other in at least first and second axes of motion of said machining apparatus;

position feedback means adapted to signal to said numerical control means information representative of the actual position of said holding means at least in said first and second axis respectively;

position reference means associated with said machining apparatus and including at least a pair of position reference surfaces each corresponding to one of said axes, each of said reference surfaces providing a calibrated position reference with respect to the origin position of a machining program adapted to direct the operation of said numerical control means; and transducer means positioned to sense vibrations indicative of contact between said work piece or one of said reference surfaces respectively and said cutting edge during rapid relative motion therebetween and being adapted to convert said sensed vibrations to electrical signals;

circuit means coupling said transducer means to said numerical control means adapted to discriminate against spurious signals on the basis of predetermined time domain characteristics, said circuit means being effective to select signals generated by said transducer means in response to vibrations transmitted as a consequence of an actual probing contact between said cutting edge and a surface;

whereby the position of said cutting edge may be calibrated in at least said first and second axes through probing contacts with said reference surfaces during rapid relative motion therebetween and the precision of machining said work piece surface in accordance with said machining program is enhanced by means of modifying compensating offsets determined at least in part by said calibration.

22. A system in accordance with claim 21, wherein said machining apparatus comprises a lathe including a rotatable spindle, a saddle and a cross slide mounted on said saddle;
said tool holding means being mounted on said cross slide;
said means for providing rapid relative motion including means for rotating said work piece holding means with said spindle;
said reference surfaces being adapted to rotate jointly with said work piece holding means;
at least one of said reference surfaces comprising a cylindrical surface coaxial with said spindle and positioned at a calibrated radial distance from said origin;
at least one other reference surface comprising a planar surface normal to the spindle axis and positioned at a calibrated axial distance with respect to said origin;
said means for positioning said respective holding means relative to each other comprising means for moving said saddle and said cross slide in said first and second axes respectively relative to said work piece holding means; and
said transducer means being mounted to sense vibrations transmitted through said tool when said cutting edge makes probing contact with a surface.

23. A system in accordance with claim 22 wherein said transducer means is mounted on said tool holding means.

24. A system in accordance with claim 23 wherein said position reference surfaces constitute surfaces of said work piece holding means.

25. A system in accordance with claim 23, wherein said position reference means comprises a separate structure mounted on said work piece holding means and adapted to move in unison therewith.

26. A system in accordance with claim 21, wherein said machining apparatus comprises a milling machine;
said means for positioning said respective holding means relative to each other comprising means for moving said work piece holding means at least in said first and second axes and means for moving said tool holding means at least in a third axis at an angle to the plane defined by said first and second axes;
said position reference means being mounted on said work piece holding means and including at least first, second and third reference surfaces each normal to one of said axes;
said position feedback means including means for indicating the position of said work piece holding means at least in said first and second axis respectively, and means for indicating the position of said tool holding means at least in said third axis;
said means for providing rapid relative motion including means for rotating said tool around an axis of rotation parallel to said plane adapted to operate at least during said removal of material from work piece;
said transducer means being mounted to sense vibrations transmitted through said work piece when said cutting edge makes contact with the latter.

27. A system in accordance with claim 26 wherein said transducer means is mounted on said work piece holding means.

28. A system in accordance with claim 21 wherein said means for providing rapid relative motion between said cutting edge and said work piece comprises:
means for providing substantially continuous motion of one of said work piece or said cutting edge respectively relative to the other during contact therebetween adapted to remove material from said work piece;
means for inducing reciprocating motion in one of said work piece or said cutting edge respectively adapted to produce vibrations through intermittent contact therebetween substantially without removing material from said work piece; and
means for disabling said continuous motion during the occurrence of said reciprocating motion.

29. A system in accordance with claim 22 wherein said means for providing rapid relative motion further includes means for jointly inducing reciprocating motion in said work piece holding means and said reference surfaces while the rotation of said work piece holding means is halted.

30. A system in accordance with claim 26 wherein said means for providing rapid relative motion further includes means for inducing reciprocating motion in said tool holding means while positioning of said work piece holding means in said first and second axes is halted.

31. Apparatus in accordance with claim 21 wherein said circuit means comprises:
means for successively providing a count window;
an amplifier/filter circuit coupled to the output of said transducer means and including amplifier means and band-pass filter means;
at least a counts channel and an events channel coupled to said amplifier/filter circuit;
said channels including first voltage comparator means adapted to convert each positive-going analog signal excursion coupled thereto from said amplifier/filter circuit to a corresponding digital pulse if said signal excursion exceeds a predetermined first low-level threshold;
said counts channel further including second voltage comparator means adapted to pass all vibration-originated digital pulses in excess of a predetermined second low-level threshold;
counter means coupled to said comparator means and adapted to provide a total count of said last-recited pulses passed in said counts channel during one count window;
means for generating a counts channel success signal in the form of a logic level shift when said last-recited total count exceeds a first predetermined digital count threshold, the duration of said logic level shift extending from the time said count threshold is exceeded to the end of said count window;
said events channel further including third voltage comparator means for passing only vibration-originated digital pulses in excess of a predetermined high-level threshold;
event clock means coupled to said third comparator means, said event clock means being adapted to provide clock frequency pulses throughout the duration of each digital pulse received from said third comparator means if such received pulse falls within said count window;
means for providing a count of said event clock pulses generated during said count window;
means for generating a digital pulse representative of a significant event whenever said clock pulse count exceeds a second predetermined digital count threshold during said count window;

means for providing a count of said significant event pulses generated during said count window;

means for providing an events channel success signal in the form of a logic level shift whenever said significant event pulse count exceeds a third predetermined digital count threshold, the duration of said last-recited logic level shift extending from the time said third count threshold is exceeded to the end of said count window; and means responsive to the concurrence of success signals from said respective channels to provide a tool touch digital signal indicative of said actual probing contact.

32. A method in accordance with claim 6 wherein said rapid relative motion for said machining is provided by said rotation in a forward direction; and said rapid relative motion for said probing is provided by said rotation in a backward direction.

33. A method in accordance with claim 7 wherein said rotation is halted during each of said probing operations.

34. In a numerical control system of the type in which a machine tool includes workpiece holding means for holding a workpiece, tool holding means for holding a tool, a reference surface at a predetermined location with respect to a home position of the tool holding means, positioning motors for effecting relative motion between the tool and workpiece, apparatus for providing a continuous indication of actual tool displacement from the home position and apparatus coupled to the tool for providing a tool touch signal when the tool contacts the reference surface or workpiece is operative in a closed loop mode and in response to a stored program, a method of numerical control operation comprising the steps of:

(a) providing, in response to the stored program, first move command signals to the positioning motors to cause the tool to move from the home position into contact with the reference surface whereby a tool touch signal is generated;

(b) sensing the indicated displacement of the tool from the home position when the tool touch signal is generated;

(c) comparing the indicated tool displacement to a programmed displacement obtained from the stored program;

(d) computing a deviation between the indicated tool displacement and the programmed displacement;

(e) establishing a first tool offset value based upon the computed deviation to compensate for such deviation;

(f) providing, in response to the stored program, a plurality of control signals to effect machining of the workpiece based upon the first tool offset value;

(g) terminating the control signals prior to finish machining of the workpiece;

(h) providing second move command signals to effect movement of the tool into contact with the reference surface;

(i) sensing again the indicated tool displacement from the home position with the reference surface;

(j) re-computing the deviation between the again sensed tool displacement and the programmed tool displacement;

(k) modifying the first tool offset value in accordance with the re-computed deviation;

(l) providing third move command signals to cause the tool to move into contact with the workpiece;

(m) sensing tool contact with the workpiece;

(n) comparing the sensed tool displacement upon contact with the workpiece to the programmed tool displacement;

(o) computing the remaining machining necessary to finish the workpiece based upon said last mentioned comparison and the actual desired dimensions of the workpiece; and (p) providing a plurality of control signals to effect finish machining of the workpiece.

35. The method of claim 34 wherein the steps of providing first, second and third move command signals to effect movement of the tool to a surface each includes the substeps of:

generating a feedhold signal in response to the tool touch signal to terminate said first move command signal;

generating a negative error signal in response to said feedhold signal;

applying said negative error signal to cause the positioning motors to rapidly halt tool advancement.

36. The method of claim 35 wherein said negative error signal is of sufficient magnitude to effect a rapid reversal of the positioning motors to cause the tool to move a short distance away from the contacted surface or workpiece.

* * * * *